United States Patent
Fakoorian et al.

(10) Patent No.: US 11,617,198 B2
(45) Date of Patent: Mar. 28, 2023

(54) PHYSICAL UPLINK SHARED CHANNEL REPETITION ACROSS SLOT BOUNDARY

(71) Applicant: QUALCOMM Incorporated, San Diego, CA (US)

(72) Inventors: Seyed Ali Akbar Fakoorian, San Diego, CA (US); Seyedkianoush Hosseini, San Diego, CA (US); Wanshi Chen, San Diego, CA (US); Peter Gaal, San Diego, CA (US); Jing Jiang, San Diego, CA (US); Krishna Kiran Mukkavilli, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 2 days.

(21) Appl. No.: 16/790,608

(22) Filed: Feb. 13, 2020

(65) Prior Publication Data
US 2020/0267756 A1    Aug. 20, 2020

Related U.S. Application Data

(60) Provisional application No. 62/911,894, filed on Oct. 7, 2019, provisional application No. 62/886,859, filed
(Continued)

(51) Int. Cl.
*H04W 56/00*    (2009.01)
*H04W 72/14*    (2009.01)
(Continued)

(52) U.S. Cl.
CPC ............... *H04W 72/14* (2013.01); *H04L 1/18* (2013.01); *H04L 27/2607* (2013.01);
(Continued)

(58) Field of Classification Search
CPC ... H04W 72/14; H04W 76/27; H04W 56/001; H04W 72/042; H04W 72/0446; H04W 80/02; H04L 1/18; H04L 27/2607
(Continued)

(56) References Cited

U.S. PATENT DOCUMENTS

| | | | |
|---|---|---|---|
| 11,206,549 B1* | 12/2021 | Eyuboglu | ............. H04W 16/16 |
| 2013/0188533 A1* | 7/2013 | He | ......................... H04L 5/0048 |
| | | | 370/280 |

(Continued)

FOREIGN PATENT DOCUMENTS

WO    WO2019207488 A1    10/2019

OTHER PUBLICATIONS

CMCC: "Discussion on PUSCH Repetition for Grant-free Transmission," 3GPP Draft, 3GPP TSG RAN WG1 Meeting #92bis, R1-1804103, 3rd Generation Partnership Project (3GPP), Mobile Competence Centre, 650, Route Des Lucioles, F-06921, Sophia-Antipolis Cedex, France, vol. RAN WG1, No. Sanya, China; Apr. 16, 2018-Apr. 20, 2018, Apr. 15, 2018 (Apr. 15, 2018), XP051426392, 3 pages, Retrieved from the Internet: URL: http://www.3gpp.org/ftp/Meetings%5F3GPP%5FSYNC/RAN1/Docs/ [retrieved on Apr. 15, 2018], the whole document<span id="_wysihtml5-undo" class="_wysihtml5-temp">.
(Continued)

*Primary Examiner* — Sai Ming Chan
(74) *Attorney, Agent, or Firm* — Terry Tsai

(57) ABSTRACT

This disclosure provides methods, devices, and systems for physical uplink shared channel (PUSCH) repetition based on support signaling, such as an uplink grant that includes a time domain resource assignment for transmitting one or more data repetitions that may cross a slot boundary. The UE may identify directions (for example, uplink, downlink, flexible) for one or more symbols spanning a transmission
(Continued)

duration of the time domain resource assignment. The directions may be determined using a dynamic slot format indication (SFI), or semi-static SFIs may be used as a fallback (when dynamic slot format indications do not meet a target reliability). The uplink grant may include an indication of which symbol directions can be used for the one or more data repetitions. A subset of the one or more symbols for scheduling the one or more data repetitions may be determined based on the identified directions.

25 Claims, 17 Drawing Sheets

Related U.S. Application Data on Aug. 14, 2019, provisional application No. 62/806,732, filed on Feb. 15, 2019.

(51) Int. Cl.
*H04W 72/0446* (2023.01)
*H04L 27/26* (2006.01)
*H04L 1/18* (2023.01)
*H04W 76/27* (2018.01)
*H04W 80/02* (2009.01)
*H04W 72/04* (2023.01)

(52) U.S. Cl.
CPC ....... *H04W 56/001* (2013.01); *H04W 72/042* (2013.01); *H04W 72/0446* (2013.01); *H04W 76/27* (2018.02); *H04W 80/02* (2013.01)

(58) Field of Classification Search
USPC .......................................................... 370/329
See application file for complete search history.

(56) References Cited

U.S. PATENT DOCUMENTS

| | | | |
|---|---|---|---|
| 2019/0149380 A1 | 5/2019 | Babaei et al. | |
| 2019/0215843 A1 | 7/2019 | Liu et al. | |
| 2019/0230689 A1 | 7/2019 | Cao et al. | |
| 2019/0363843 A1 | 11/2019 | Gordaychik et al. | |
| 2020/0022171 A1* | 1/2020 | Guan | H04W 72/0446 |
| 2020/0287676 A1* | 9/2020 | Jo | H04W 72/0413 |
| 2021/0084687 A1* | 3/2021 | Liu | H04W 72/0446 |
| 2021/0195449 A1* | 6/2021 | Yi | H04B 17/318 |
| 2022/0070873 A1* | 3/2022 | Tang | H04W 76/27 |

OTHER PUBLICATIONS

LG Electronics: "Discussion on Enhancement for Grant-free Transmission," 3GPP Draft, 3GPP TSG RAN WG1 Ad-Hoc Meeting 1901, R1-1900596, Discussion on Enhancement for Grant-free Transmission, 3rd Generation Partnership Project (3GPP), Mobile Competence Centre, 650, Route Des Lucioles, F-06921, Sophia-Antipolis Cedex, France, vol. RAN WG1, No. Taipei, Taiwan; Jan. 21, 2019-Jan. 25, 2019, Jan. 20, 2019 (Jan. 20, 2019), XP051593443, 7 pages, Retrieved from the Internet:URL: http://www.3gpp.org/ftp/Meetings%5F3GPP%5FSYNC/RAN1/Docs/R1%2D1900596%2Ezip [retrieved on Jan. 20, 2019], paragraphs [0003], [0004].

Partial International Search Report—PCT/US2020/018389—ISA/EPO—dated Jun. 25, 2020 (191577WO).

Qualcomm Incorporated: "PUSCH Enhancements for eURLLC", 3GPP Draft, 3GPP TSG-RAN WG1 #98, R1-1909266, PUSCH Enhancements for eURLLC, 3rd Generation Partnership Project (3GPP), Mobile Competence Centre, 650, Route Des Lucioles, F-06921, Sophia-Antipolis Cedex, France, vol. Ran WG1, No. Prague, Czech Republic; Aug. 26, 2019-Aug. 30, 2019, Aug. 17, 2019 (Aug. 17, 2019), XP051765871, 5 pages, Retrieved from the Internet: URL:http://www.3gpp.org/ftp/tsg_ran/WG1_RL1/TSGR1_98/Docs/R1-1909266.zip [retrieved on Aug. 17, 2019],the whole document.

Vivo: "PUSCH Enhancements for URLLC," 3GPP Draft, 3GPP TSG RAN WG1 Ad-Hoc Meeting 1901, R1-1900128, PUSCH Enhancements for URLLC, 3rd Generation Partnership Project (3GPP), Mobile Competence Centre, 650, Route Des Lucioles, F-06921, Sophia-Antipolis Cedex, France, vol. RAN WG1, No. Taipei; Jan. 21, 2019-Jan. 25, 2019, Jan. 20, 2019 (Jan. 20, 2019), XP051593054, 8 pages, Retrieved from the Internet: URL: http://www.3gpp.org/ftp/Meetings%5F3GPP%5FSYNC/RAN1/Docs/R1%2D1900128%2Ezip [retrieved on Jan. 20, 2019] paragraph [02.1].

Wilus Inc: "On PUSCH Enhancement for eURLLC", 3GPP Draft, 3GPP TSG RAN WG1 Ad-Hoc Meeting 1901, R1-1901011, PUSCH Final, 3rd Generation Partnership Project (3GPP), Mobile Competence Centre, 650, Route Des Lucioles, F-06921, Sophia-Antipolis Cedex, France, vol. RAN WG1, No. Taipei, Taiwan; Jan. 21, 2019-Jan. 25, 2019, Jan. 20, 2019 (Jan. 20, 2019), XP051593856, 3 pages, Retrieved from the Internet: URL:http://www.3gpp.org/ftp/Meetings%5F3GPP%5FSYNC/RAN1/Docs/R1%2D1901011%2Ezip [retrieved on Jan. 20, 2019], the whole document<span id="_wysihtml5-undo" class="_wysihtml5-temp">.

International Search Report and Written Opinion—PCT/US2020/018389—ISA/EPO—dated Sep. 2, 2020 (191577WO).

\* cited by examiner

PHYSICAL UPLINK SHARED CHANNEL REPETITION ACROSS SLOT BOUNDARY

CROSS REFERENCE

The present Application for Patent claims the benefit of U.S. Provisional Patent Application No. 62/806,732 by FAKOORIAN et al., entitled "PHYSICAL UPLINK SHARED CHANNEL REPETITION ACROSS SLOT BOUNDARY," filed Feb. 15, 2019, and the benefit of U.S. Provisional Patent Application No. 62/886,859 by FAKOORIAN et al., entitled "PHYSICAL UPLINK SHARED CHANNEL REPETITION ACROSS SLOT BOUNDARY," filed Aug. 14, 2019, and the benefit of U.S. Provisional Patent Application No. 62/911,894 by FAKOORIAN et al., entitled "PHYSICAL UPLINK SHARED CHANNEL REPETITION ACROSS SLOT BOUNDARY," filed Oct. 7, 2019, assigned to the assignee hereof, and expressly incorporated herein.

TECHNICAL FIELD

The following relates generally to wireless communications, and more specifically to physical uplink shared channel (PUSCH) repetition across one or more slot boundaries.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

In some wireless communications systems, such as NR systems, communication devices (for example, a base station or a UE) may support flexibility for data transmission over configured resources of a channel. For example, the base station and the UE may support ultra-reliable low latency (URLLC) communication in order to reduce end-to-end latency for data transmission and reception. URLLC communication may be used by the base station and the UE for mission critical applications that include stringent communication performance and reliability targets. URLLC communication may support data transmission over a temporal duration that is less than a slot of a radio frame. For example, the base station and the UE may support a mapping type (for example, type B) that supports data transmission on one or more symbols within a slot. As part of a type B mapping for downlink transmission, the base station may support a mini-slot transmission duration that corresponds to 2, 4, or 7 OFDM symbols within a slot. In other examples, as part of a type B mapping for uplink transmission, the UE may support a transmission duration of 1 to 14 OFDM symbols.

In some examples, however, data payloads for communication may be too large for transmission close to a slot boundary. That is, the number of remaining symbols within a single slot may not be large enough to support a complete data transmission. Additionally, some transmission instances may not cross slot boundaries for transmission. Data transmissions may have to be delayed until a subsequent slot in order to utilize the proper code rate for transmission, which may result in an increase in latency in transmission. Increased latency may impose reliability and efficiency constraints on wireless systems, particularly for URLLC communications. Improved techniques and systems are desired.

SUMMARY

The described techniques relate to methods, systems, devices, and apparatuses that support physical uplink shared channel (PUSCH) repetition across slot boundaries. Generally, the described techniques support a user equipment (UE) receiving signaling, such as a downlink control information (DCI), that includes an uplink grant and a time domain resource assignment for transmitting one or more data repetitions of uplink data. The time domain resource assignment may include an index value for a table (for example, PUSCH-TimeDomainAllocationList) configured according to radio resource control (RRC) signaling. The index value may correspond to a start and length indicator value (SLIV) that includes a starting symbol and a transmission duration for the one or more data repetitions. The UE may identify directions for a plurality of symbols spanning the transmission duration, including symbols within a first slot and symbols within a second slot. The directions may include uplink symbols, flexible symbols, and downlink symbols associated with a slot format. Based on the identified directions for the plurality of symbols, the UE may determine a subset of the plurality of symbols for scheduling the one or more data repetitions and performing uplink signaling on the channel.

A method of wireless communications at a user equipment (UE) is described. The method may include receiving, from a base station, signaling including an uplink grant for one or more data repetitions, the uplink grant including a time domain resource assignment that spans a plurality of slots for the one or more data repetitions, identifying directions for a plurality of symbols within the time domain resource assignment, determining a subset of the plurality of symbols for scheduling the plurality of data repetitions based on the identified directions for the plurality of symbols, and transmitting, to the base station, the one or more data repetitions over the subset of the plurality of symbols. In some examples, the subset of the plurality of symbols may span a slot boundary (for example, the subset of the plurality of symbols may include symbols in two or more slots).

An apparatus for wireless communications at a UE is described. The apparatus may include a processor, memory in electronic communication with the processor, and instructions stored in the memory. The instructions may be executable by the processor to cause the apparatus to receive, from a base station, signaling including an uplink grant for one or more data repetitions, the uplink grant including a time domain resource assignment that spans a set of slots for the one or more data repetitions, identify directions for a plurality of symbols within the time domain resource assignment, determine a subset of the plurality of symbols for scheduling the one or more data repetitions based on the identified directions for the plurality of symbols, and transmit, to the base station, the one or more data repetitions over the subset of the plurality of symbols. In some examples, the subset of the plurality of symbols may span a slot boundary (for example, the subset of the plurality of symbols may include symbols in two or more slots).

Another apparatus for wireless communications at a UE is described. The apparatus may include means for receiving, from a base station, signaling including an uplink grant for one or more data repetitions, the uplink grant including a time domain resource assignment that spans a set of slots for the one or more data repetitions, identifying directions for a plurality of symbols within the time domain resource assignment, determining a subset of the plurality of symbols for scheduling the one or more data repetitions based on the identified directions for the plurality of symbols, and transmitting, to the base station, the one or more data repetitions over the subset of the plurality of symbols. In some examples, the subset of the plurality of symbols may span a slot boundary (for example, the subset of the plurality of symbols may include symbols in two or more slots).

A non-transitory computer-readable medium storing code for wireless communications at a UE is described. The code may include instructions executable by a processor to receive, from a base station, signaling including an uplink grant for one or more data repetitions, the uplink grant including a time domain resource assignment that spans a set of slots for the one or more data repetitions, identify directions for a plurality of symbols within the time domain resource assignment, determine a subset of the plurality of symbols for scheduling the one or more data repetitions based on the identified directions for the plurality of symbols, and transmit, to the base station, the one or more data repetitions over the subset of the plurality of symbols. In some examples, the subset of the plurality of symbols may span a slot boundary (for example, the subset of the plurality of symbols may include symbols in two or more slots).

In some examples of the method, apparatuses, and non-transitory computer-readable medium described herein, determining the subset of the set of symbols may include operations, features, means, or instructions for identifying a semi-static flexible symbol of the set of symbols that may be a guard symbol that occurs between an ending symbol allocated for downlink reception within the set of symbols and a beginning symbol allocated for uplink transmission within the set of symbols, where the subset of the set of symbols excludes the semi-static flexible symbol.

In some examples of the method, apparatuses, and non-transitory computer-readable medium described herein, identifying the semi-static flexible symbol may include operations, features, means, or instructions for receiving control signaling that indicates a semi-static slot format indication for a slot that includes the semi-static flexible symbol.

In some examples of the method, apparatuses, and non-transitory computer-readable medium described herein, identifying the semi-static flexible symbol may include operations, features, means, or instructions for receiving dynamic control signaling or semi-static control signaling that indicates a number of guard symbols between the ending symbol allocated for downlink reception within the plurality of symbols and the beginning symbol allocated for uplink transmission.

In some examples of the method, apparatuses, and non-transitory computer-readable medium described herein, determining the subset of the set of symbols may include operations, features, means, or instructions for identifying a semi-static flexible symbol of the set of symbols that may be included within a common search space for a defined control resource set, where the subset of the set of symbols excludes the semi-static flexible symbol.

Some examples of the method, apparatuses, and non-transitory computer-readable medium described herein may further include operations, features, means, or instructions for receiving control signaling indicating one or more symbols allocated to the common search space for the defined control resource set.

In some examples of the method, apparatuses, and non-transitory computer-readable medium described herein, identifying the semi-static flexible symbol may include operations, features, means, or instructions for receiving control signaling that indicates a semi-static slot format indication for a slot that includes the semi-static flexible symbol.

In some examples of the method, apparatuses, and non-transitory computer-readable medium described herein, identifying the semi-static flexible symbol may include operations, features, means, or instructions for receiving the semi-static slot format indication through a medium access control-control element which indicates one or more symbols for uplink transmission of the one or more data repetitions.

In some examples of the method, apparatuses, and non-transitory computer-readable medium described herein, determining the subset of the set of symbols may include operations, features, means, or instructions for identifying a semi-static flexible symbol of the set of symbols that may be allocated for a synchronization signal block, where the subset of the set of symbols excludes the semi-static flexible symbol.

Some examples of the method, apparatuses, and non-transitory computer-readable medium described herein may further include operations, features, means, or instructions for receiving control signaling indicating one or more symbols allocated for the synchronization signal block.

Some examples of the method, apparatuses, and non-transitory computer-readable medium described herein may further include operations, features, means, or instructions for receiving control signaling that indicates a semi-static slot format indication for a slot that includes the semi-static flexible symbol.

In some examples of the method, apparatuses, and non-transitory computer-readable medium described herein, the control signaling comprises at least one of: downlink control information, a medium access control-control element, or radio resource control signaling.

In some examples of the method, apparatuses, and non-transitory computer-readable medium described herein, the UE does not receive a first control message, before or after receiving the uplink grant scheduling a first data transmission having a defined latency condition and a defined reliability condition within the time domain resource assignment, that schedules the UE to receive a second data transmission on a semi-static flexible symbol from a set of one or more semi-static flexible symbols within the time domain resource assignment that may be usable for transmitting the one or more data repetitions.

In some examples of the method, apparatuses, and non-transitory computer-readable medium described herein, the UE does not receive a first control message, after receiving the uplink grant scheduling a first data transmission within the time domain resource assignment, that schedules the UE to receive a second data transmission on a semi-static flexible symbol from a set of one or more semi-static flexible symbols within the time domain resource assignment that may be usable for transmitting the one or more data repetitions, the first data transmission having a lower latency condition and a higher reliability condition than the second data transmission. In some examples, the second data transmission may have a lower latency condition and a higher reliability condition than the first data transmission.

In some examples of the method, apparatuses, and non-transitory computer-readable medium described herein, the uplink grant cancels a resource allocation by a second control message that may be received before the uplink grant, the second control message scheduling a third data transmission within at least one semi-static flexible symbol from a set of one or more semi-static flexible symbols within the time domain resource assignment that may be usable for transmitting the one or more data repetitions, the first data transmission having a lower latency condition and a higher reliability condition than the third data transmission.

Some examples of the method, apparatuses, and non-transitory computer-readable medium described herein may further include operations, features, means, or instructions for identifying at least one semi-statically configured downlink symbol within one or more symbols of the subset allocated for transmission of a first repetition of the one or more data repetitions, and segmenting the first repetition.

In some examples of the method, apparatuses, and non-transitory computer-readable medium described herein, segmenting the first repetition may include operations, features, means, or instructions for skipping transmission within at least one semi-statically configured downlink symbol of the subset allocated for transmission of the first repetition. In some examples, one or more semi-statically downlink symbols may be skipped.

Some examples of the method, apparatuses, and non-transitory computer-readable medium described herein may further include operations, features, means, or instructions for segmenting a first repetition of the one or more data repetitions into a set of data subrepetitions based on identifying that one or more symbols of the subset of the plurality of symbols allocated for transmission of the first repetition crosses a slot boundary between consecutive slots of the set of slots, and transmitting the set of data subrepetitions within the plurality of symbols of the subset allocated for transmission of the first repetition.

Some examples of the method, apparatuses, and non-transitory computer-readable medium described herein may further include operations, features, means, or instructions for receiving a dynamic grant that reallocates a semi-static flexible symbol, within one or more symbols of the subset of the plurality of symbols allocated for transmission of a first repetition of the one or more data repetitions, to a downlink symbol, and determining to ignore the dynamic grant based on receiving the signaling including the uplink grant, where the dynamic grant may be received before or after the uplink grant.

In some examples of the method, apparatuses, and non-transitory computer-readable medium described herein, the UE does not receive a control message, before or after receiving the uplink grant, that informs the UE of a dynamic grant that reallocates a semi-static flexible symbol, within one or more symbols of the plurality of symbols of the subset allocated for transmission of a first repetition of the one or more data repetitions, to a downlink symbol.

In some examples of the method, apparatuses, and non-transitory computer-readable medium described herein, the signaling may include an indication of a repetition length and a number of repetitions, and where the one or more data repetitions may be transmitted over the subset of the plurality of symbols based on the repetition length and the number of repetitions.

In some examples of the method, apparatuses, and non-transitory computer-readable medium described herein, a transmission duration of the time domain resource assignment indicates a contiguous set of symbols corresponding to the plurality of symbols.

In some examples of the method, apparatuses, and non-transitory computer-readable medium described herein, a transmission duration of the time domain resource assignment indicates a duration of the subset of the plurality of symbols, the subset of the plurality of symbols corresponding to symbols configured for uplink transmission within the plurality of symbols.

Some examples of the method, apparatuses, and non-transitory computer-readable medium described herein may further include operations, features, means, or instructions for determining a repetition length for the one or more data repetitions based on a duration between a starting symbol of the time domain resource assignment and a last symbol of a first slot of the set of slots.

Some examples of the method, apparatuses, and non-transitory computer-readable medium described herein may further include operations, features, means, or instructions for determining a number of repetitions for the one or more data repetitions based on the repetition length and a transmission duration of the time domain resource assignment.

Some examples of the method, apparatuses, and non-transitory computer-readable medium described herein may further include operations, features, means, or instructions for identifying the directions for the plurality of symbols based on the semi-static slot format indication for the set of slots regardless of a presence of a dynamic slot format indication associated with at least one of the set of slots. In some cases, the semi-static format indication or the dynamic slot format indication may be indicated by a grant transmitted to a UE.

Some examples of the method, apparatuses, and non-transitory computer-readable medium described herein may further include operations, features, means, or instructions for receiving a semi-static slot format indication. In some examples of the method, apparatuses, and non-transitory computer-readable medium described herein, determining the subset includes identifying a set of uplink symbols for the one or more data repetitions corresponding to uplink symbols in the semi-static slot format indication.

Some examples of the method, apparatuses, and non-transitory computer-readable medium described herein may further include operations, features, means, or instructions for receiving a semi-static slot format indication. In some examples of the method, apparatuses, and non-transitory computer-readable medium described herein, the determining the subset includes identifying a set of uplink symbols for the one or more data repetitions corresponding to uplink symbols and flexible symbols in the semi-static slot format indication.

Some examples of the method, apparatuses, and non-transitory computer-readable medium described herein may further include operations, features, means, or instructions for receiving a semi-static slot format indication. In some examples of the method, apparatuses, and non-transitory computer-readable medium described herein, the determining the subset includes identifying a set of uplink symbols for the one or more data repetitions corresponding to uplink symbols, flexible symbols, and at least one downlink symbol in the semi-static slot format indication.

In some examples of the method, apparatuses, and non-transitory computer-readable medium described herein, the dynamic slot format indication converts a flexible symbol of a semi-static slot format to a downlink symbol.

In some examples of the method, apparatuses, and non-transitory computer-readable medium described herein, the dynamic slot format indication may be received within or prior to a first slot of the set of slots.

In some examples of the method, apparatuses, and non-transitory computer-readable medium described herein, the dynamic slot format indication may be received in a group-common physical downlink control channel (GC-PDCCH) message.

In some examples of the method, apparatuses, and non-transitory computer-readable medium described herein, the semi-static slot format indication may be a first semi-static slot format indication associated with a first traffic type, the method further including receiving a second semi-static slot format indication associated with a second traffic type.

Some examples of the method, apparatuses, and non-transitory computer-readable medium described herein may further include operations, features, means, or instructions for receiving a second grant including a second time domain resource assignment associated with a second traffic type, and identifying a second subset of the plurality of symbols for scheduling a data communication over the second time domain resource assignment based on the dynamic slot format indication.

In some examples of the method, apparatuses, and non-transitory computer-readable medium described herein, the uplink grant includes a dynamic slot format indication associated with at least one of the set of slots, and the identifying the directions for the plurality of symbols may be based on the dynamic slot format indication.

In some examples of the method, apparatuses, and non-transitory computer-readable medium described herein, the uplink grant identifies one of the set of slot format patterns for the at least one of the set of slots.

In some examples of the method, apparatuses, and non-transitory computer-readable medium described herein, the set of slot format patterns may be received via RRC signaling.

In some examples of the method, apparatuses, and non-transitory computer-readable medium described herein, the uplink grant includes an indication of availability of downlink symbols or flexible symbols for the one or more data repetitions, and the determining the subset of the plurality of symbols for scheduling the one or more data repetitions may be based on the indication.

Some examples of the method, apparatuses, and non-transitory computer-readable medium described herein may further include operations, features, means, or instructions for receiving a first dynamic slot format indication for at least one of the set of slots associated with a first traffic type, receiving a second dynamic slot format indication for at least one of the set of slots associated with a second traffic type, and where the one or more data repetitions may be associated with the first traffic type and the identifying the directions for the plurality of symbols may be based on the first dynamic slot format indication.

Some examples of the method, apparatuses, and non-transitory computer-readable medium described herein may further include operations, features, means, or instructions for receiving a second grant including a second time domain resource assignment associated with the second traffic type, and identifying, based on the second grant, a second subset of the plurality of symbols for scheduling a data communication of the second traffic type based on the directions for the plurality of symbols identified based on the first dynamic slot format indication.

Some examples of the method, apparatuses, and non-transitory computer-readable medium described herein may further include operations, features, means, or instructions for receiving a second grant including a second time domain resource assignment associated with the second traffic type, and identifying, based on the second grant, a second subset of the plurality of symbols for scheduling a data communication of the second traffic type based on the directions for the plurality of symbols identified based on the second dynamic slot format indication.

In some examples of the method, apparatuses, and non-transitory computer-readable medium described herein, the first dynamic slot format indication may be inconsistent with the second dynamic slot format indication, and where the identifying the directions for the plurality of symbols may be based on a semi-static slot format indication or a dynamic slot format indication.

Some examples of the method, apparatuses, and non-transitory computer-readable medium described herein may further include operations, features, means, or instructions for determining a repetition format from a set of repetition formats for the one or more data repetitions, the set of repetition formats including a first repetition format having one or more repetitions of an indicated mini-slot duration in each of the set of slots and a second repetition format including a single repetition for each set of contiguous uplink symbols for each of the set of slots.

Some examples of the method, apparatuses, and non-transitory computer-readable medium described herein may further include operations, features, means, or instructions for determining the repetition format based on an indicator in the uplink grant of the first repetition format or the second repetition format for the one or more data repetitions.

In some examples of the method, apparatuses, and non-transitory computer-readable medium described herein, the determining the repetition format may be based on comparing a transmission duration of the time domain resource assignment for the one or more data repetitions with a threshold duration.

Some examples of the method, apparatuses, and non-transitory computer-readable medium described herein may further include operations, features, means, or instructions for receiving a first slot format indication indicating downlink symbols of the set of slots, receiving a second slot format indication indicating uplink symbols of the set of slots, and where determining the subset of the plurality of symbols for scheduling the one or more data repetitions includes including in the subset of the plurality of symbols a symbol indicated as a downlink symbol in the first slot format indication and indicated as an uplink symbol in the second slot format indication.

DETAILED DESCRIPTION

Figure 1:
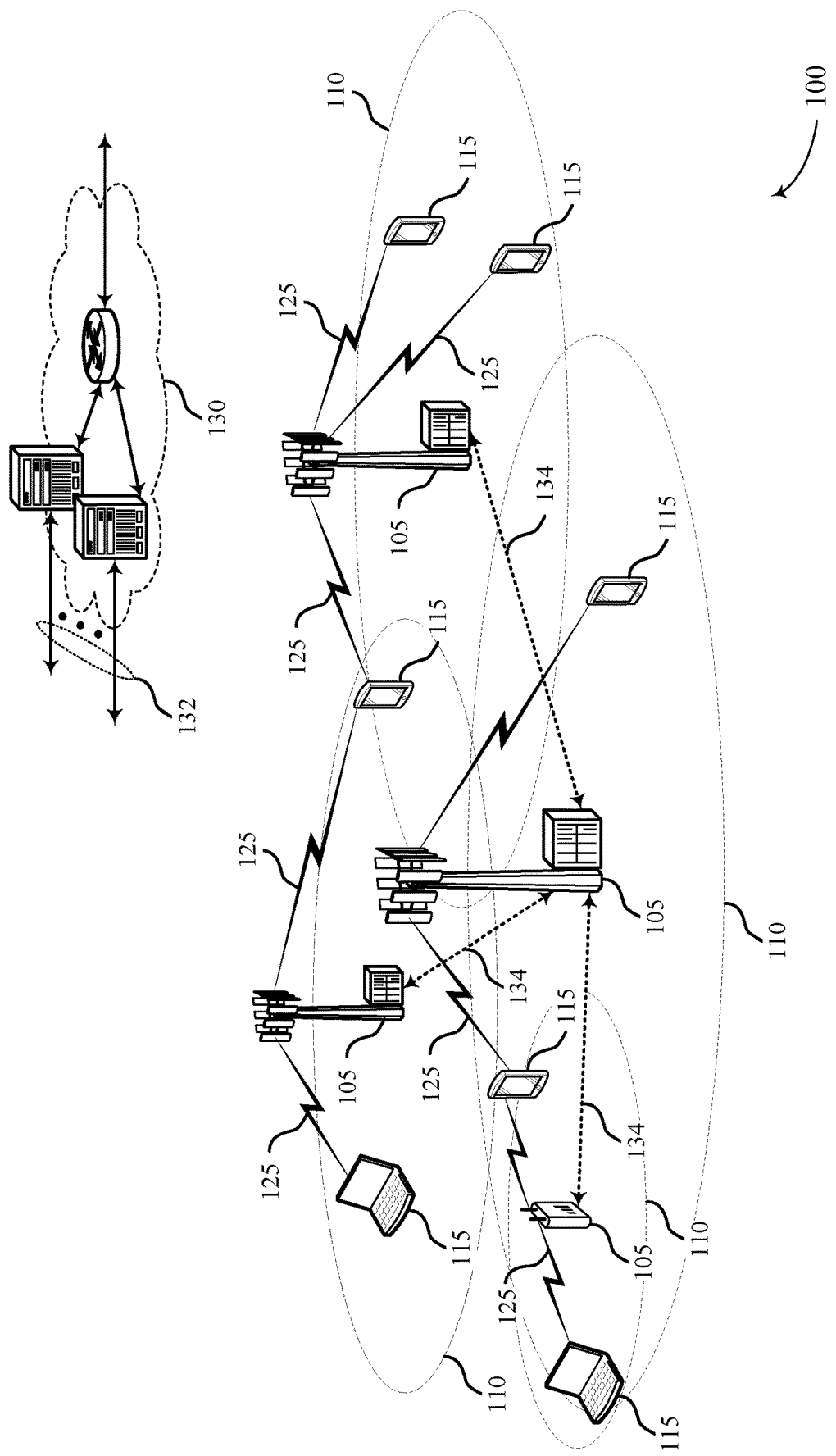
FIG. 1 illustrates an example of a wireless communications system that supports physical uplink shared channel (PUSCH) repetition across slot boundary in accordance with aspects of the present disclosure.

In some wireless communication systems, a user equipment (UE) may receive downlink signaling, such as downlink control information (DCI), that includes an uplink grant for communication. The uplink grant may include a time domain resource assignment that indicates an index value (for example, for an allocated table specified in PUSCH-TimeDomainAllocationList) configured according to radio resource control (RRC) signaling. The index value may correspond to a start and length indicator value (SLIV) that includes a starting symbol and a transmission duration for transmitting the uplink data payload. In some implementations, however, the UE may receive the uplink grant close to a configured slot boundary of the channel, and the number of remaining symbols within the slot may not be large enough to support complete data transmission without crossing a slot boundary.

In order to improve latency in communication, particularly for mission critical applications that may include ultra-reliable low latency (URLLC) communication, the UE may support one or more data repetitions for transmitting the uplink data payload. The UE may determine a repetition length for the one or more data repetitions based on the starting symbol and the transmission duration, as indicated by the SLIV value. For example, the UE may schedule one or more physical uplink shared channel (PUSCH) repetitions within a slot or in each of a set of consecutive slots based on the uplink grant (which may be called mini-slot repetition). In other examples, the UE may schedule a single repetition for each of the consecutive slots, unless a slot is formatted to include multiple distinct uplink symbol periods (which may be called multi-segment repetition).

As described herein, the UE may support identifying a SLIV associated with the indicated time domain resource assignment. The starting symbol and transmission duration of the SLIV may indicate a configuration for performing uplink transmission over one or more data repetitions that span consecutive slots. For example, the UE may determine a starting symbol and a transmission duration that spans a contiguous set of uplink symbols within the consecutive slots (for example, the transmission duration may correspond to a total number of symbols used for one or more repetitions of the transmission). In other examples, the UE may determine a starting symbol and a transmission duration that spans a number of uplink symbols within the consecutive slots (for example, the transmission duration may correspond to a number of uplink symbols, which may not be contiguous).

The UE may identify directions for the one or more symbols as part of a slot format. For example, each of the slots may include uplink symbols, downlink symbols, and flexible symbols for communicating data traffic. In some examples, the UE may receive a semi-static slot format indication (for example, that identifies slot formats for each slot of each frame). In some examples, the semi-static slot format indication may be overwritten by a dynamic slot format indication. However, in some implementations the dynamic slot format indication may be transmitted using signaling (for example, a group common physical downlink control channel (GC-PDCCH)) that has a lower reliability (for example, a larger block error rate) than a target reliability for a traffic type of the data to be transmitted (for example, URLLC). According to various aspects, the UE may ignore the dynamic slot format indication for data transmissions associated with some traffic types such as URLLC. Thus, the UE may identify a set of uplink symbols for the one or more data repetitions based on the semi-static slot format indication, even when the dynamic slot format indication may be received and correctly decoded.

According to various aspects, the UE may use different types of symbols for uplink transmissions and retransmissions. For example, the UE may use uplink symbols and may skip or drop downlink and flexible symbols, or the UE may use uplink and flexible symbols and skip or drop downlink symbols, or the UE may use uplink and flexible symbols and at least one downlink symbol. In other examples, the uplink grant may include bit indications for whether flexible symbols or downlink symbols may be used for scheduling the one or more data repetitions. Additionally or alternatively, the UE may receive one or more dynamic slot format indications associated with different types of data traffic, or the UE may receive an indication of an RRC configured slot format. The UE may determine a subset of the one or more symbols for scheduling the one or more data repetitions according to the identified directions and based on the time domain resource assignment. The UE may transmit the one or more data repetitions of the uplink data payload over the determined subset.

Aspects of the disclosure are initially described in the context of a wireless communications system. Aspects of the disclosure are further described in the context of another wireless communications system, one or more transmission schemes, and a process flow that relates to PUSCH repetition across slot boundary. Aspects of the disclosure are further illustrated by and described with reference to apparatus diagrams, system diagrams, and flowcharts that relate to PUSCH repetition across slot boundary.

FIG. 1 illustrates an example of a wireless communications system 100 that supports physical uplink shared channel repetition across slot boundary in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, wireless communications system 100 may support enhanced broadband communications, ultra-reliable (for example, mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (for example, macro or small cell base stations). The UEs 115 described herein may be able to communicate with various types of base stations 105 and network equipment including macro eNBs, small cell eNBs, gNBs, and relay base stations.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area 110 (for example, a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, among other examples, which may be implemented in various articles such as appliances, vehicles, and meters, among other examples.

Some UEs 115, such as MTC or IoT devices, may be low cost or low complexity devices, and may provide for automated communication between machines (for example, via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (for example, a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (for example, according to narrowband communications). In some examples, UEs 115 may be designed to support critical functions (for example, mission critical functions), and a wireless communications system 100 may be configured to provide ultra-reliable communications for these functions.

In some examples, a UE 115 may also be able to communicate directly with other UEs 115 (for example, using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some examples, groups of UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (for example, via an S1, N2, N3, or other interface). Base stations 105 may communicate with one another over backhaul links 134 (for example, via an X2, Xn, or other interface) either directly (for example, directly between base stations 105) or indirectly (for example, via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (for example, control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (for example, radio heads and access network controllers) or consolidated into a single network device (for example, a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, because the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (for example, less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (for example, from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some examples, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some examples, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some examples, operations in unlicensed bands may be based on a carrier aggregation configuration in conjunction with component carriers operating in a licensed band (for example, LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (for example, a base station 105) and a receiving device (for example, a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (for example, the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (for example, a base station 105 or a UE 115) to shape or steer an antenna beam (for example, a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying some amplitude and phase offsets to signals carried via each of the antenna elements associated with the device. The adjustments associated with each of the antenna elements may be defined by a beamforming weight set associated with a particular orientation (for example, with respect to the antenna array of the transmitting device or receiving device, or with respect to some other orientation).

In one example, a base station 105 may use multiple antennas or antenna arrays to conduct beamforming operations for directional communications with a UE 115. For instance, some signals (for example synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (for example, by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (for example, a direction associated with the receiving device, such as a UE 115). In some examples, the beam direction associated with transmissions along a single beam direction may be determined based on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (for example, for identifying a beam direction for subsequent transmission or reception by the UE 115), or transmitting a signal in a single direction (for example, for transmitting data to a receiving device).

A receiving device (for example, a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (for example, when receiving a data signal). The single receive beam may be aligned in a beam direction determined based on listening according to different receive beam directions (for example, a beam direction determined to have a highest signal strength, highest signal-to-noise ratio, or otherwise acceptable signal quality based on listening according to multiple beam directions).

In some examples, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some examples, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some examples, UEs 115 and base stations 105 may support retransmissions of data to increase the likelihood that data is received successfully. HARQ feedback is one technique of increasing the likelihood that data is received correctly over a communication link 125. HARQ may include a combination of error detection (for example, using a cyclic redundancy check (CRC)), forward error correction (FEC), and retransmission (for example, automatic repeat request (ARQ)). HARQ may increase throughput at the MAC layer in poor radio conditions (for example, signal-to-noise conditions). In some examples, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling duration of $T_s=1/30,720,000$ seconds. Time intervals of a communications resource may be organized according to radio frames each having a duration of 10 milliseconds (ms), where the frame duration may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms.

A subframe may be further divided into 2 slots each having a duration of 0.5 ms, and each slot may contain 6 or 7 modulation symbol durations (for example, depending on the length of the cyclic prefix prepended to each symbol duration). Excluding the cyclic prefix, each symbol duration may contain 2048 sampling durations. In some examples, a subframe may be the smallest scheduling unit of the wireless communications system 100, and may be referred to as a transmission time interval (TTI). In other examples, a smallest scheduling unit of the wireless communications system 100 may be shorter than a subframe or may be dynamically selected (for example, in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (for example, an evolved universal mobile telecommunication system terrestrial radio access (E-UTRA) absolute radio frequency channel number (EARFCN)), and may be positioned according to a channel raster for discovery by UEs 115. Carriers may be downlink or uplink (for example, in an FDD mode), or be configured to carry downlink and uplink communications (for example, in a TDD mode). In some examples, signal waveforms transmitted over a carrier may be made up of multiple sub-carriers (for example, using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (for example, LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (for example, synchronization signals or system information, etc.) and control signaling that coordinates operation for the carrier. In some examples (for example, in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (for example, between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (for example, 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a portion or range (for example, set of subcarriers or RBs) within a carrier (for example, "in-band" deployment of a narrowband protocol type).

In a system employing MCM techniques, a resource element may consist of one symbol duration (for example, a duration of one modulation symbol) and one subcarrier, where the symbol duration and subcarrier spacing are inversely related. The number of bits carried by each resource element may depend on the modulation scheme (for example, the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (for example, spatial layers), and the use of multiple spatial layers may further increase the data rate for communications with a UE 115.

Devices of the wireless communications system 100 (for example, base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some examples, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some examples, an eCC may be associated with a carrier aggregation configuration or a dual connectivity configuration (for example, when multiple serving cells have a suboptimal or non-ideal backhaul link). An eCC may also be configured for use in unlicensed spectrum or shared spectrum (for example, where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (for example, to conserve power).

In some examples, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (for example, according to frequency channel or carrier bandwidths of 20, 40, 60, 80 MHz, etc.) at reduced symbol durations (for example, 16.67 microseconds). A TTI in eCC may consist of one or multiple symbol durations. In some examples, the TTI duration (that is, the number of symbol durations in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (for example, across the frequency domain) and horizontal (for example, across the time domain) sharing of resources.

Wireless communications system 100 may support communication for mission critical applications that include stringent communication performance and reliability targets. For example, a base station 105 and a UE 115 may support URLLC communication in order to reduce end to end latency for data transmission and reception. Additionally or alternatively, the base station 105 and the UE 115 may support enhanced mobile broadband (eMBB) communications that support high data rates across wide coverage areas.

In order to reduce latency in communication for mission critical applications, the base station 105 and the UE 115 may support flexibility for data transmission over configured resources of a channel. For example, URLLC communication may support data transmission over a temporal duration that is less than a slot of a radio frame. The base station 105 and the UE 115 may support a mapping type (for example, type B mapping) that supports data transmission (such as grant-based uplink transmission) on one or more symbols within a slot. As part of a type B mapping for downlink transmission, the base station 105 may support a mini-slot transmission duration that corresponds to 2, 4, or 7 OFDM symbols within a slot. In other examples, as part of a type B mapping for uplink transmission, the UE 115 may support a transmission duration of 1 to 14 OFDM symbols.

In some examples, in order to reduce latency for grant-based uplink signaling, the UE 115 may support one or more data repetitions for transmitting an uplink data payload. For example, the UE 115 may schedule two or more physical uplink shared channel (PUSCH) repetitions for a slot or across a slot boundary in consecutive slots based on the uplink grant (for example, mini-slot repetition). In other examples, the UE 115 may schedule a single repetition in each slot of the consecutive slots, unless a slot is formatted to include multiple distinct uplink symbol periods (for example, multi-segment repetition). The one or more data repetitions may correspond to one or more redundancy versions or transmit repetitions of an uplink data payload. A repetition may increase the decoding probability for transmissions around a slot border. For example, the UE 115 may transmit a first repetition of an uplink data payload prior to a slot boundary, and a second repetition of the uplink data payload after a slot boundary. In some examples, the grant received by the UE 115 may indicate a number of repetitions of the uplink data payload that the UE 115 is to transmit. In addition, each repetition may include a portion or all of the uplink data payload. In some examples, a first and second data repetition may include the same content, each repetition may include a different portion of the uplink data payload, or each repetition may include redundancy information (for example, perhaps different than any redundancy information in the uplink data payload) that assists in decoding.

Techniques are described for identifying a time domain resource determination at the UE 115 based on reception of downlink control signaling, including an uplink grant that contains a time domain resource assignment. The time domain resource assignment may identify a SLIV value, which may indicate the starting symbol and transmission duration for an uplink transmission over one or more data repetitions that span consecutive slots. For example, the UE 115 may determine a starting symbol and a transmission duration that spans a contiguous set of uplink symbols within the consecutive slots (for example, the transmission duration may correspond to a total number of symbols used for one or more repetitions of the transmission). In other examples, the UE 115 may determine a starting symbol and a transmission duration that spans a number of uplink symbols within the consecutive slots. For example, the transmission duration may correspond to a number of non-contiguous uplink symbols.

Within a transmission duration, the UE 115 may identify directions for the one or more symbols as part of a slot format. For example, each of the slots may include uplink symbols, downlink symbols, and flexible symbols for communicating data traffic. In some examples, the UE 115 may receive a semi-static slot format indication that identifies slot formats for each slot of each frame. In some examples, the semi-static slot format indication may be overwritten by a dynamic slot format indication. A dynamic slot format indication may indicate the slot format for the slot in which it is received, as well as one or more additional slots, in some examples. The UE 115 may identify a set of uplink symbols for the one or more data repetitions based on received dynamic slot format indications associated with the supported traffic type. In other examples, the UE 115 may identify a set of uplink symbols for the one or more data repetitions based on a semi-static slot format indication, even when the dynamic slot format indication may be received and correctly decoded. In some examples, an SFI indication may be included in a MAC-CE indication which indicates one or more symbols for an uplink transmission (for example, for transmitting the one or more data repetitions).

In some examples, the dynamic slot format indication may be transmitted using signaling (for example, a group common physical downlink control channel (GC-PDCCH)) that has a lower reliability (for example, a larger block error rate) than a target reliability for a traffic type of the data to be transmitted (for example, URLLC). According to various aspects, the UE 115 may ignore the dynamic slot format indication for data transmissions associated with such lower reliability traffic types (such as eMBB, for example).

According to various aspects, the UE 115 may use different types of symbols for uplink transmissions and retransmissions. For example, the UE 115 may use uplink symbols and skip or drop downlink and flexible symbols, or the UE 115 may use uplink and flexible symbols and skip or drop downlink symbols, or the UE 115 may use uplink and flexible symbols and at least one downlink symbol. Additionally or alternatively, within the downlink control signaling (such as in DCI), the uplink grant may include bit indications for whether flexible symbols or downlink symbols may be used for transmitting the one or more data repetitions or an indication of an RRC configured slot format.

The UE 115 may determine a subset of the one or more symbols for scheduling the one or more data repetitions according to the identified directions (uplink, downlink or flexible) and based on the time domain resource assignment. The UE 115 may transmit the one or more data repetitions of the uplink data payload over the determined subset of symbols. The described techniques may reduce latency in communication and improve transmission reliability for end to end communications between the base station 105 and the UE 115.

Figure 2:
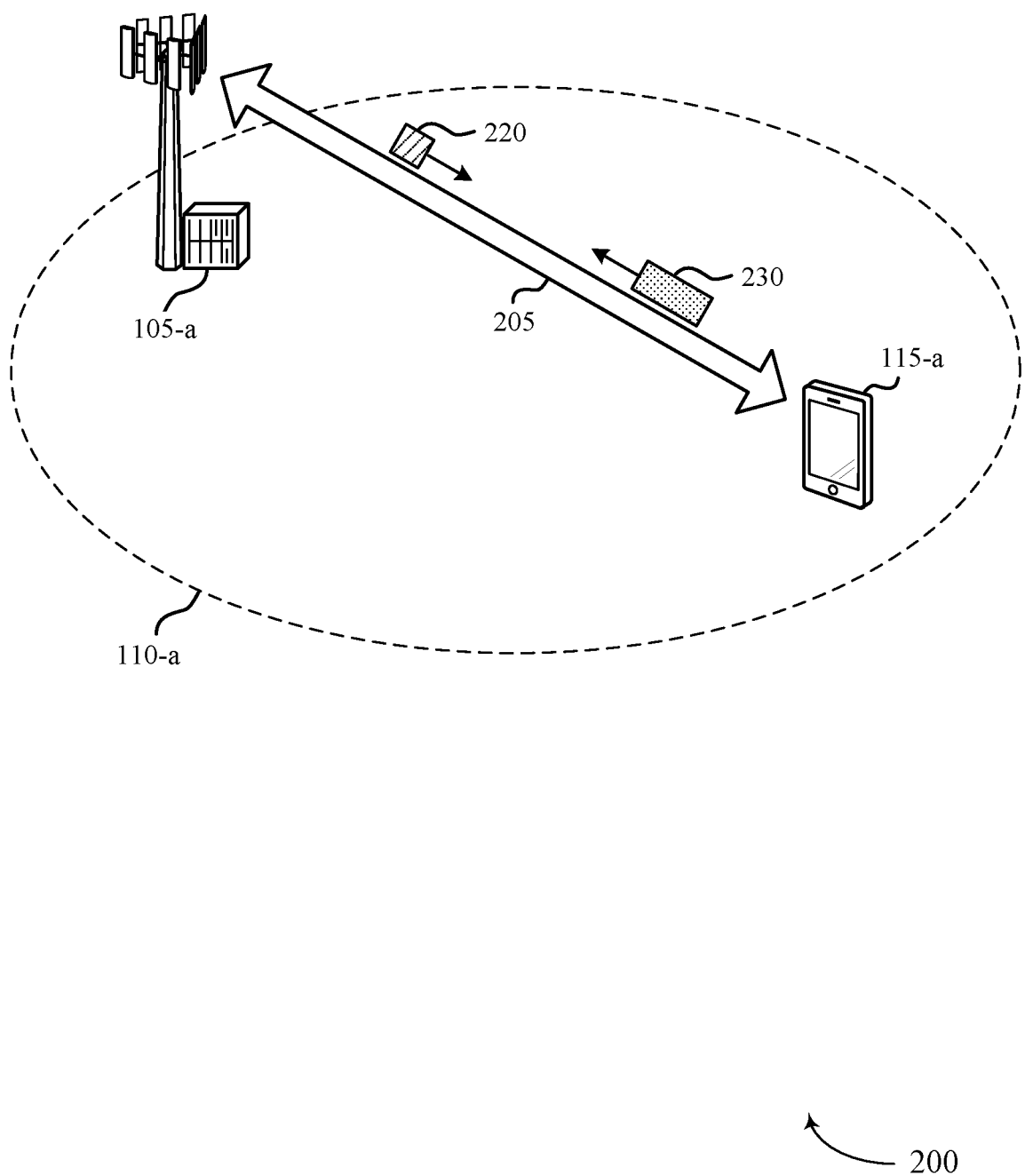
FIG. 2 illustrates an example of a wireless communications system that supports PUSCH repetition across slot boundary in accordance with aspects of the present disclosure.

FIG. 2 illustrates an example of a wireless communications system 200 that supports PUSCH repetition across slot boundary in accordance with aspects of the present disclosure. The wireless communications system 200 may include a base station 105-*a* that supports communication with a UE 115-*a* within a supported coverage area 110-*a*. In some examples, the communication may support mission critical applications that include stringent communication performance and reliability targets. For example, the base station 105-*a* and the UE 115-*a* may support URLLC data traffic in order to reduce end-to-end latency for data transmission and reception. Additionally or alternatively, the base station 105-*a* and the UE 115-*a* may support eMBB data traffic associated with high data rates across wide coverage areas. In some examples, wireless communications system 200 may implement aspects of wireless communication system 100.

In wireless communications system 200, the UE 115-*a* and the base station 105-*a* may support flexibility for data transmission over configured resources of a channel. In some examples, the supported flexibility may include capability for data transmission and reception over a temporal duration that is less than a slot of a radio frame. For example, the UE 115-*a* and the base station 105-*a* may support one or more mapping types (for example, type A, type B) for mapping uplink and downlink data payloads on shared resources of the channel. The mapping types may be based on a configured cyclic prefix and may include a set of available starting symbol and transmission duration combinations for the communication. The supported flexibility may reduce latency and improve transmission reliability for mission critical applications served on the communication link 205.

In some examples, the UE 115-*a* may receive configuration (for example, RRC) signaling from the base station 105-*a* that includes information for supporting services associated with one or more types of data traffic. For example, the RRC signaling may include one or more configuration parameters, including a configuration for a physical downlink shared channel (PDSCH) and grant-based PUSCH data payloads (for example, PDSCH-Config, PUSCH-Config). The one or more configuration parameters may include information elements of an allocation list for PDSCH scheduling (for example, PDSCH-AllocationList). Similarly, the one or more indication parameters may include an allocated table for PUSCH scheduling (for example, PUSCH-TimeDomainAllocationList).

The UE 115-*a* may receive control signaling (such as DCI) from the base station 105-*a* that includes an uplink grant 220, which may include a time domain resource assignment for performing the uplink transmission. For example, the time domain resource assignment may specify an index value of the allocated table for PUSCH scheduling. Based on the index value, the UE 115-*a* may identify a configured SLIV value and determine a starting symbol and transmission duration for transmitting the uplink data payload 230. In some examples, the uplink grant 220 may include a starting symbol close to a configured slot boundary of the channel, and the number of remaining symbols within the slot may not be large enough to support complete data transmission without crossing a slot boundary. That is, the UE 115-*a* may identify the SLIV value and determine a transmission duration that spans symbols included in consecutive slots.

In order to reduce latency in communication, the UE 115-*a* may support one or more data repetitions for transmitting the uplink data payload 230. The UE 115-*a* may determine a repetition length for the one or more data repetitions based on the starting symbol and the transmission duration, as indicated by the SLIV value. For example, the UE 115-*a* may schedule two or more physical uplink shared channel (PUSCH) repetitions within a slot or in each of consecutive slots based on the uplink grant (for example, mini-slot repetition). In other examples, the UE 115-*a* may schedule a single repetition for each of the consecutive slots, unless a slot is formatted to include multiple distinct sets of uplink symbols, in which case the UE 115-*a* may schedule a single repetition for each set of uplink symbols (which may be called, multi-segment repetition).

In some examples, the UE 115-*a* may determine a repetition length for the one or more data repetitions based on a duration between the starting symbol and a last symbol of the slot containing the starting symbol. The UE 115-*a* may also determine a number of repetitions for the one or more data repetitions based on the transmission duration associated with the SLIV value and a repetition duration. In some examples, the UE 115-*a* may identify an indication to use mini-slot repetition or multi-segment repetition for the data repetitions associated with the uplink data payload 230. For example, the UE 115-*a* may receive an explicit indication via DCI that indicates a switch between mini-slot repetition or multi-segment repetition for the data repetitions. In other examples, the UE 115-*a* may evaluate the total transmission time for the PUSCH data payload and determine a repetition option based on the evaluation. In some examples, the UE 115-*a* may determine a total transmission time (for example, PUSCH duration) for the one or more data repetitions is high (for example, higher than a threshold which may be one or more symbols or slots), and determine latency is not an issue and higher reliability is desired. The UE 115-*a* may then use multi-segment based repetition for the one or more data repetitions within the consecutive slots. In other examples, the UE 115-*a* may determine a total transmission time (for example, PUSCH duration) for the one or more data repetitions is low, and determine that minimal latency is desired. The UE 115-*a* may then use mini-slot based repetition for the one or more data repetitions within the consecutive slots. Additionally or alternatively, the UE 115-*a* may combine the mini-slot based repetition with early termination to allow faster acknowledgement for the repetitions at the base station 105-*a*.

Within a transmission duration, the UE 115-*a* may identify directions for the one or more symbols as part of a slot format. For example, each of the slots may include uplink symbols, downlink symbols, and flexible symbols for communicating data traffic. The UE 115-*a* may support one or more procedures for identifying the directions for the one or more symbols based on the supported data traffic of the communication. For example, for URLLC data traffic (for example, a first traffic type), the UE 115-*a* may receive a semi-static slot format indication (for example, that identifies slot formats for each slot of each frame). In some examples, the semi-static slot format indication may be overwritten by a dynamic slot format indication. However, in some examples the dynamic slot format indication may be transmitted using signaling (for example, a GC-PDCCH) that has a lower reliability (for example, a larger block error rate) than a target reliability for a traffic type of the URLLC data. According to various aspects, the UE 115-*a* may ignore the dynamic slot format indication for data transmission.

The UE 115-*a* may identify a set of uplink symbols for the one or more data repetitions based on a semi-static slot format indication, regardless of whether a dynamic slot format indication is received (for example, even when the dynamic slot format indication may be received and correctly decoded). According to various aspects, the UE 115-*a* may use different types of symbols for uplink transmissions and retransmissions. For example, the UE 115-*a* may use uplink symbols and skip or drop downlink and flexible symbols for scheduling the one or more data repetitions of the uplink data payload. In other examples, the UE 115-*a* may use uplink and flexible symbols and may skip or drop downlink symbols for scheduling the one or more data repetitions of the uplink data payload. By using the flexible symbols for uplink scheduling the UE 115-*a* may assume that using the flexible symbol may prevent one or more additional UEs 115-*a* within the coverage area 110-*a* from transmission. That is, even if the dynamic slot format indication has indicated that the one or more flexible symbols are formatted for downlink transmission, the UE 115-*a* may ignore the dynamic slot format indication and may schedule uplink transmission according to the semi-static slot format indication. In some examples, the semi-static slot format indication may be included in a MAC-CE indication which indicates one or more symbols for the uplink transmissions (for example, for transmitting the one or more data repetitions). In other examples, the UE 115-*a* may use uplink and flexible symbols and at least one downlink symbol (for example, all or a portion of the downlink symbols) for scheduling the one or more data repetitions of the uplink data payload. By using at least one downlink symbol for scheduling, the UE 115-*a* may assume that some or all downlink symbols may not be used by the base station 105-*a* (for example, at least corresponding to the resource allocation), and that some semi-statically configured downlink signals may be preempted for uplink transmission by the URLLC transmission. The base station 105-*a* may transmit a preemption indication (for example, a dynamic slot format indication) in response to the preemption for uplink transmission by the URLLC transmission.

Additionally or alternatively, within the downlink control signaling (such as DCI) the uplink grant may include bit indications for whether flexible symbols or downlink symbols may be used for scheduling the one or more data repetitions. For example, the dynamic slot format indication may be transmitted using signaling (for example, a GC-PDCCH) that has a lower reliability (for example, block error rate) than a target reliability for a traffic type of the URLLC data. Instead, the base station 105-*a* may transmit a dynamic slot format index as part of a DCI transmission to the URLLC UE 115-*a*. The dynamic slot format index for DCI may include an increased robustness relative to a GC-PDCCH dynamic slot format indication. In other examples, the DCI field of the received control signaling may include a pair of configured bits for indication at the UE 115-*a*. The indicated bits may include a first bit to indicate whether flexible symbols may be used for the one or more data repetitions or a second bit to indicate whether downlink symbols may be used for the one or more data repetitions. Additionally or alternatively, the UE 115-*a* may be RRC configured with one or more slot formats and may receive an indication within the downlink control signaling (for example, uplink grant 220) that specifies a slot format of the one or more configured slot formats (for example, receive a new RRC configuration for URLLC that includes an SFI). In some examples, the UE 115-*a* may receive a slot format indication via a MAC-CE indication which indicates one or more symbols for uplink transmission (for example, for transmitting the one or more data repetitions).

In some examples, the UE 115-*a* may be capable of supporting both URLLC and eMBB data traffic (for example, first and second traffic types, respectively), and may monitor multiple control indications (for example, GC-PDCCH transmissions) for each of the data types. The control indications may be associated with the same CORESET or different CORESETs and may include distinct dynamic slot format indices. In the case of distinct dynamic slot format indices for the multiple control indications, the UE 115-*a* may support one or more operations. For example, the UE 115-*a* may follow the dynamic slot format indication for URLLC communication for scheduling both URLLC and eMBB data traffic payloads. In other examples, the UE 115-*a* may consider the distinct dynamic slot format indices as an error in signaling or decoding of the received DCI.

In other examples, the UE 115-*a* may support one or more additional or alternative procedures for identifying the directions for the one or more symbols based on the supported data traffic of the communication. For example, for eMBB data traffic, the UE 115-*a* may receive a dynamic slot format indication (for example, that identifies slot formats for each slot of each frame). The dynamic slot format indication may be transmitted using signaling (for example, a GC-PDCCH) that has sufficient or better reliability (for example, a lower block error rate) than a target reliability for a traffic type of the eMBB data. That is, the UE 115-*a* may use the most recent received dynamic slot format indication and schedule the one or more data repetitions of the uplink data payload on uplink symbols of the slot format.

Additionally or alternatively, similar to operations for URLLC data traffic, in some examples, the UE 115-*a* may ignore the dynamic slot format indication for data transmission. The UE 115-*a* may identify a set of uplink symbols for the one or more data repetitions based on a semi-static slot format indication, even when the dynamic slot format indication may be received and correctly decoded. According to various aspects, the UE 115-*a* may use different types of symbols for uplink transmissions and retransmissions. For example, the UE 115-*a* may use uplink symbols and skip or drop downlink and flexible symbols for scheduling the one or more data repetitions of the uplink data payload. In other examples, the UE 115-*a* may use uplink and flexible symbols and may skip or drop downlink symbols for scheduling the one or more data repetitions of the uplink data payload. In other examples, the UE 115-*a* may use uplink and flexible symbols and at least one downlink symbol for scheduling the one or more data repetitions of the uplink data payload.

Additionally or alternatively, within the downlink control signaling (such as DCI) the uplink grant 220 may include bit indications for whether flexible symbols or downlink symbols may be used for scheduling the one or more data repetitions. For example, the base station 105-*a* may transmit a dynamic slot format index as part of an eMBB configured DCI transmission. In other examples, the DCI field of the received control signaling may include a pair of configured bits for indication at the UE 115-*a*. The indicated bits may include a first bit to indicate whether flexible symbols may be used for the one or more data repetitions or a second bit to indicate whether downlink symbols may be used for the one or more data repetitions. Additionally or alternatively, the UE 115-*a* may be RRC configured with one or more slot formats and may receive an indication within the downlink control signaling that specifies a slot format of the one or more configured slot formats (for example, the UE 115-*a* may receive a new RRC configuration for URLLC that includes an SFI). In some examples, a slot format indication may be indicated through a MAC-CE which also indicates one or more symbols allocated for uplink transmission (for example, for the one or more data repetitions).

In some examples, the UE 115-*a* may identify different dynamic slot format indications associated with uplink and downlink communication on the channel. The different dynamic slot format indications may include overlapping transmission durations and include distinct formatting (for example, uplink or downlink) for common symbols within the consecutive slots. The UE 115-*a* may dynamically schedule PDSCH data payloads on indicated symbols of the transmission duration. Similarly, the UE 115-*a* may dynamically schedule the data repetitions on indicated symbols of the transmission duration in which the symbols are not concurrently allocated for downlink reception.

In some examples, the UE 115-*a* may be capable of supporting both URLLC and eMBB data traffic and may monitor multiple control indications (for example, GC-PDCCH transmissions) for each of the data types. The control indications may be associated with the same CORE-SET or different CORESETs, and may include distinct dynamic slot format indices. In the case of distinct dynamic slot format indices for the multiple control indications, the UE 115-*a* may support one or more operations. For example, the UE 115-*a* may follow the dynamic slot format indication for URLLC communication for scheduling both URLLC and eMBB data traffic payloads. In other examples, the UE 115-*a* may consider the distinct dynamic slot format indices as an error in signaling or decoding of the received DCI, and may, for example, fall back to using a semi-statically configured slot format indication.

Based on identifying the directions for the one or more symbols, the UE 115-*a* may determine a subset of the one or more symbols included in the transmission duration for scheduling the one or more data repetitions. In some examples, the subset of the one or more symbols may span a slot boundary (for example, the subset of the one or more symbols may include symbols in two or more slots). The UE 115-*a* may transmit the one or more data repetitions of the uplink data payload over the determined subset. The one or more data repetitions may correspond to data traffic associated with indicated URLLC or eMBB communication over the communication link 205. The described techniques may reduce latency in communications and improve transmission reliability for end to end communications between the base station 105-*a* and the UE 115-*a*.

Figure 3A:
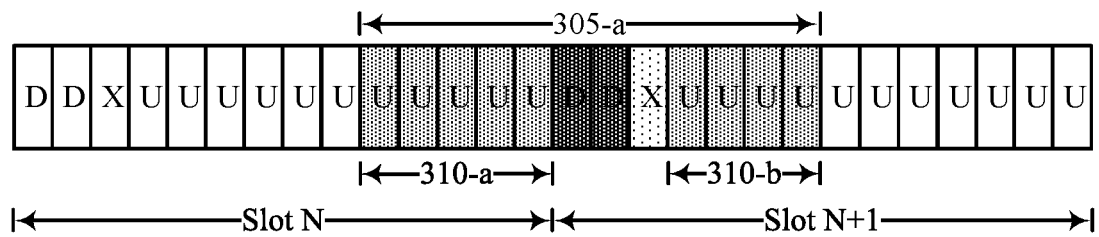
FIGS. 3A and 3B illustrate examples of transmission schemes that support PUSCH repetition across slot boundary in accordance with aspects of the present disclosure.
Figure 3B:
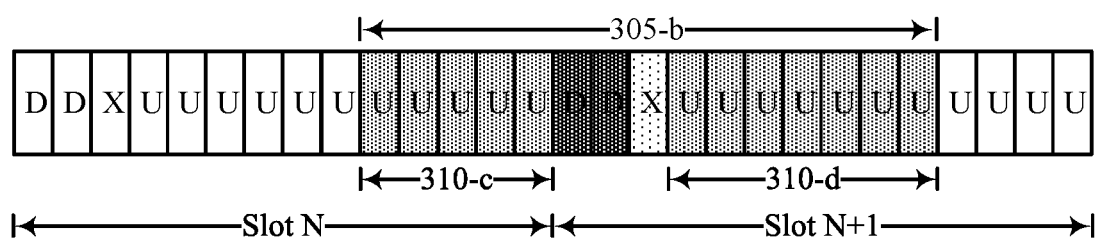

FIGS. 3A and 3B illustrate examples of a transmission schemes 300-*a* and 300-*b* that support PUSCH repetition across slot boundary in accordance with aspects of the present disclosure. The transmission schemes 300-*a* and 300-*b* may be implemented by a UE as part of a time domain resource determination, as described with reference to FIGS. 1 and 2. The time domain resource determination may include determining a starting symbol and transmission duration associated with an identified SLIV value.

In some examples, as shown in FIG. 3A, the UE may receive a time domain resource assignment (as part of DCI) and may identify a SLIV value, which may indicate a starting symbol (for example, symbol index nine (9) of slot N, as shown) and transmission duration, such as a number of slots, 305-*a* for an uplink transmission. For example, the UE may determine, from the starting symbol, an absolute number of symbols corresponding to transmission duration 305-*a*, including uplink symbols (U), downlink symbols (D), and flexible symbols (X) for the one or more consecutive slots. The transmission duration 305-*a* may correspond to contiguous symbols (for example, uplink symbols, downlink symbols, and flexible symbols) within each of slots N and N+1. The UE may determine one or more data repetitions 310 in each slot. For example, when using multi-segment transmission, the UE may schedule a first data repetition 310-*a* for the uplink data payload over a contiguous set of uplink symbols for slot N. Additionally, the UE may schedule a second data repetition 310-*b* for the uplink data payload over a contiguous set of uplink symbols for slot N+1. Alternatively or additionally, when using mini-slot repetition, the UE may schedule one or multiple data repetitions 310 within each slot (for example, two repetitions 310 in each slot). For example, a mini-slot duration may be determined to be two or three symbols, and data repetition 310-*a* may include two repetitions of two or three symbols each, and data repetition 310-*b* may include an additional two repetitions of two symbols each. In some examples, the mini-slot duration may be determined by a number of symbols between the starting symbol and a last symbol in the first slot N. For example, the mini-slot duration may depend on the number of symbols between the starting symbol and a last symbol in the first slot N, a transport block size of data to be transmitted in the data repetitions 310, and a threshold coding rate.

In other examples, as shown in FIG. 3B, the UE may receive a time domain resource assignment (as part of DCI) and may identify a SLIV value, which may indicate a starting symbol (for example, symbol index 8 of slot N, as shown) and transmission duration, such as a number of slots, 305-*b* for an uplink transmission. The UE may determine, from the starting symbol, a transmission duration 305-*b* that spans a number of uplink symbols within the consecutive slots. In some examples, the number of uplink symbols may not be contiguous. For example, the UE may determine, from the starting symbol, a number of uplink symbols (U) corresponding to the transmission duration 305-*b*. The transmission duration 305-*b* may correspond to a total transmission time across slot N and slot N+1. The UE may schedule a single repetition 310 in each slot as shown by repetitions 310-*c* and 310-*d* in FIG. 3B (for example, multi-segment transmission), or may schedule one or more repetitions 310 in each slot (for example, mini-slot repetition).

Figure 4A:
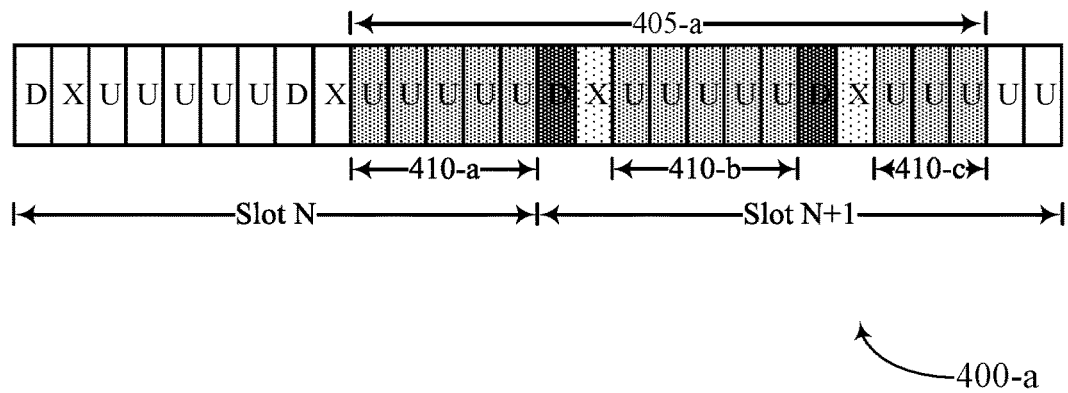
FIGS. 4A-4C illustrate examples of transmission schemes that support PUSCH repetition across slot boundary in accordance with aspects of the present disclosure.
Figure 4B:
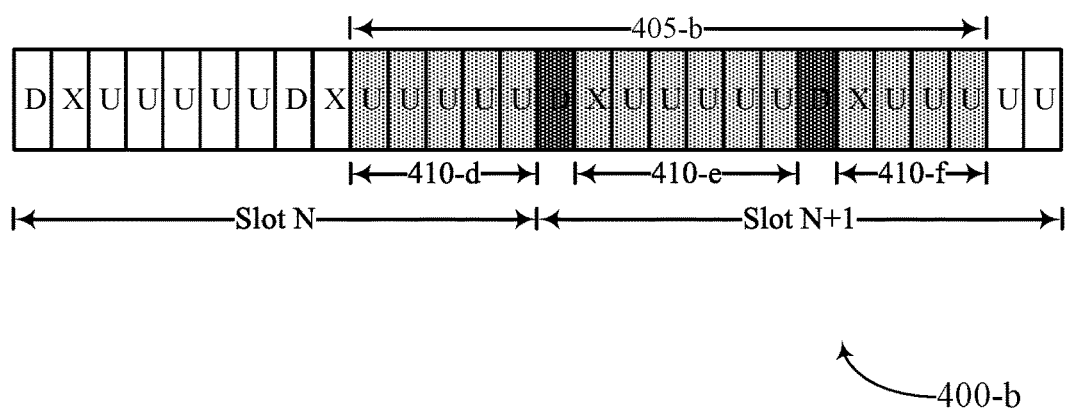
Figure 4C:
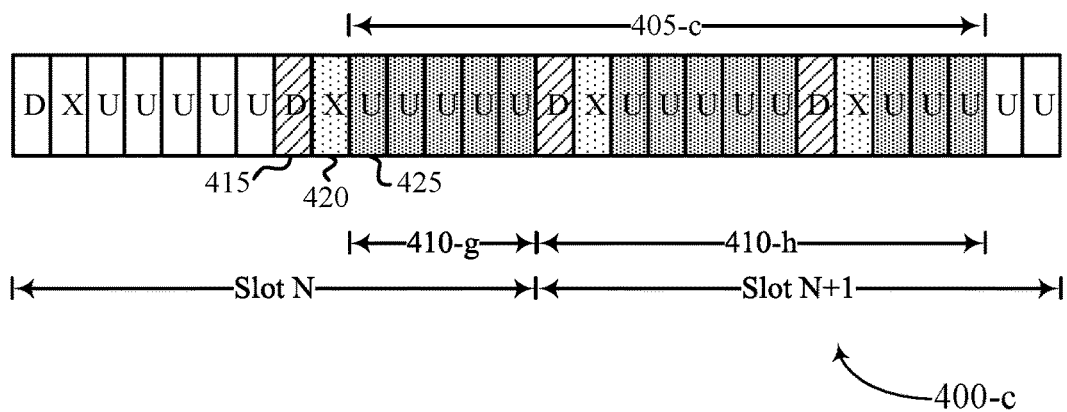

FIGS. 4A-4C illustrate examples of transmission schemes 400-*a*, 400-*b*, and 400-*c* that support PUSCH repetition across slot boundary in accordance with aspects of the present disclosure. The transmission schemes 400-*a*, 400-*b*, and 400-*c* may be implemented by a UE as part of a semi-static slot format indication for identifying directions for one or more symbols included in a transmission duration, as described with reference to FIGS. 1, 2, 3A, and 3B. The semi-static slot format indication may identify a set of uplink symbols for the one or more data repetitions. For example, the UE may use uplink symbols and may skip or drop downlink and flexible symbols, or the UE may use uplink and flexible symbols and skip or drop downlink symbols, or the UE may use uplink and flexible symbols and at least one downlink symbol.

As described herein, each of the one or more slots included in a data frame may include uplink symbols, downlink symbols, and flexible symbols for communicating data traffic. In some examples, the UE may receive a semi-static slot format indication (for example, that identifies slot formats for each slot of each frame). In some examples, the semi-static slot format indication may be overwritten by a dynamic slot format indication. A dynamic slot format indication may indicate the slot format for the slot in which it is received, as well as one or more additional slots, in some examples. In some implementations the dynamic slot format indication may be transmitted using signaling (for example, a group common physical downlink control channel (GC-PDCCH)) that has a lower reliability (for example, block error rate) than a target reliability for a traffic type of the data to be transmitted (for example, URLLC). According to various aspects, the UE may ignore the dynamic slot format indication for data transmissions associated with some traffic types such as URLLC, and in some examples, eMBB. Instead, the UE may identify a set of uplink symbols for the one or more data repetitions based on a semi-static slot format indication. According to various aspects, the UE may use different types of symbols for uplink transmissions and retransmissions.

In some examples, as shown in FIG. 4A, the UE may use uplink symbols and skip or drop downlink and flexible symbols for scheduling the one or more data repetitions associated with the uplink data payload. For example, the UE may determine a starting symbol (for example symbol index 9) of a slot N and a transmission duration 405-*a* based on a SLIV value. The UE may schedule a first data repetition 410-*a* (for example, for multi-segment transmission) over a set of configured uplink symbols (U) within slot N. Additionally, the UE may schedule a data repetition 410-*b* and a subsequent data repetition 410-*c* over sets of contiguous uplink symbols (U) within a subsequent slot N+1. The symbols associated with data repetitions 410-*b* and 410-*c* may correspond to distinct sets of contiguous uplink symbols within the slot N+1. Alternatively or additionally, for mini-slot repetition, the UE may schedule a first set of one or more data repetitions 410-*a* over a set of configured uplink symbols (U) within slot N, and second and third sets of data repetitions 410-*b* and 410-*c* within distinct sets of contiguous uplink symbols within the slot N+1.

In other examples, as shown in FIG. 4B, the UE may use uplink and flexible symbols and skip or drop downlink symbols for scheduling the one or more data repetitions associated with the uplink data payload. For example, the UE may determine a starting symbol (for example symbol index 9) of a slot N and a transmission duration 405-*b* based on a SLIV value. The UE may schedule a first data repetition 410-*d* (for example, for multi-segment transmission) over a set of configured uplink symbols (U) within slot N. Additionally, the UE may schedule a data repetition 410-*e* and a subsequent data repetition 410-*f* over sets of uplink symbols (U) and flexible symbols (X) within a subsequent slot N+1. By using the flexible symbols for uplink scheduling the UE may assume that using the flexible symbols may prevent or reduce transmission interference from one or more additional UEs. That is, even if the dynamic slot format indication has indicated the one or more flexible slots are formatted for downlink transmission, the UE may ignore the dynamic slot format indication and schedule uplink transmission according to the semi-static slot format indication. Alternatively or additionally, for mini-slot repetition, the UE may schedule a first set of one or more data repetitions 410-*e* over a set of configured uplink symbols (U) and flexible symbols (X) within slot N, and second and third sets of data repetitions 410-*e* and 410-*f* within distinct sets of contiguous uplink symbols (U) or flexible symbols (X) within the slot N+1.

In some cases, the semi-static format indication or the dynamic slot format indication may be indicated by a grant transmitted to a UE, and the UE may use the slot format indicated in a first grant it receives, or the UE may use the slot format indicated in an interrupting grant (for example, in some cases, the UE may receive a dynamic grant after receiving a semi-static grant, and may use the dynamic slot format indication). In some examples, the UE may determine the priority of the data associated with each slot format indication, and may use the slot formation associated with the higher priority data. For example, the UE may receive a dynamic grant after receiving a semi-static grant, and may use the semi-static slot format based on a latency or reliability target for the data associated with the semi-static slot format.

In other examples, as shown in FIG. 4C, the UE may use uplink and flexible symbols and at least one downlink symbol for scheduling the one or more data repetitions associated with the uplink data payload. For example, the UE may determine a starting symbol (for example symbol index 9) of a slot N and a transmission duration 405-*c* based on a SLIV value. The UE may schedule a first data repetition 410-*g* (for example, for multi-segment transmission) over a set of configured uplink symbols (U) within slot N. Additionally, the UE may schedule a data repetition 410-*h* over a contiguous set of uplink symbols (U), flexible symbols (X), and downlink symbols (D) within a subsequent slot N+1. By using at least one downlink symbol for scheduling, the UE may assume that some downlink symbols may not be used by the base station, and that some semi-statically configured downlink signals will be preempted for uplink transmission. Alternatively or additionally, for mini-slot repetition, the UE may schedule a first set of one or more data repetitions 410-*g* over a contiguous set of uplink symbols (U), flexible symbols (X), and downlink symbols (D) within slot N, and a second set of data repetitions 410-*h* over a distinct set of contiguous uplink symbols (U), flexible symbols (X), and downlink symbols (D) within the slot N+1. For either multi-segment transmission or mini-slot repetition, a portion of the downlink symbols may be used, while other downlink symbols may not be used for the data repetitions 410. For example, some downlink symbols may carry additional signaling such as reference signals, synchronization signals, or broadcast channels, and may be skipped or dropped for the data repetitions 410.

In some examples described herein, the UE may use uplink and flexible symbols and at least one downlink symbol for scheduling the one or more data repetitions associated with the uplink data payload. In such examples, the UE may use flexible symbols (X) for uplink transmissions. In some other examples, however, the UE may determine that the flexible symbols may not be used for uplink transmissions such that the flexible symbols may not be used for scheduling the one or more data repetitions associated with the uplink data payload. In addition, in some examples the UE may determine that both uplink symbols and downlink symbols may be used, and that flexible symbols may not be used for scheduling the one or more data repetitions associated with the data payload.

In one case, the UE may identify a semi-static flexible symbol 420 that acts as a gap symbol (for example, a guard symbol) located between an ending symbol 415 (for example, allocated for downlink reception) and a starting symbol 425 (for example, allocated for a next uplink transmission). The semi-static flexible symbol 420 may in some aspects be a gap symbol, and may act as a guard period between downlink and uplink transmission periods. Over a gap symbol, the UE may transition between transmission and reception modes or may use an amount of time for the gap symbol to apply timing advance or other timing control procedures. In some implementations, there may be multiple gap symbols located between an ending symbol 415 (for downlink transmissions) and a starting symbol 425 (for uplink transmissions). The number of gap symbols may be indicated to the UE, for example, either dynamically in DCI, semi-statically (for example, through RRC or a MAC-CE), or in other control signaling. Accordingly, semi-static flexible symbols that act as gap symbols may not be reallocated as uplink symbols, and the UE may not use gap symbols for uplink transmissions. In some examples, the UE may receive control signaling (for example, RRC signaling) that indicates a semi-static slot format indication for a slot that includes the semi-static flexible symbol 420 that falls within a time domain resource assignment. Due to the semi-static flexible symbol 420 being a guard symbol, the UE may determine to exclude the semi-static flexible symbol 420 from the subset of symbols scheduled for transmitting an uplink transmission of one or more data repetitions. The UE may skip transmitting the uplink transmission within the semi-static flexible symbol 420, and may instead transmit the uplink transmission in the identified subset of the symbols within the time domain resource assignment that does not include the semi-static flexible symbol 420.

In another example, the UE may receive control information in a master information block (MIB) that indicates a number of symbols that are part of a common search space for a defined control resource set (CORESET). The UE may identify a semi-static flexible symbol (X) that is included in the common search space for the defined CORESET (for example, CORESET 0). For example, a semi-static flexible symbol (X) may be indicated, via pdcch-ConfigSIB1 in MIB for a CORESET for a Type0-PDCH common search space (CSS) set. In such examples, the UE may not use the semi static flexible symbol (X) that is included in the common search space for an uplink (for example, PUSCH) transmission. In some examples, the UE may receive control signaling (for example, RRC signaling) that indicates one or more symbols allocated to the common search space for a slot that includes the semi-static flexible symbol 420, which falls within a time domain resource assignment. Due to the semi-static flexible symbol 420 including the common search space for the defined CORESET, the UE may determine to exclude the semi-static flexible symbol 420 from the subset of symbols scheduled for transmitting an uplink transmission of one or more data repetitions. The UE may skip transmitting the uplink transmission within the semi-static flexible symbol 420 (for example, due to overlap with the common search space), and may instead transmit the uplink transmission in the identified subset of the symbols within the time domain resource assignment that does not include the semi-static flexible symbol 420.

In yet another case, the UE may receive control information that indicates a semi-static flexible symbol (X) that may be allocated for synchronization signaling (for example, the semi-static flexible symbol (X) may be indicated as a synchronization signal block). In some examples, the semi-static flexible symbol (X) may be indicated, via ssb-PositionsInBurst in SIB1, for the reception of SS/PBCH blocks. In some other examples, the semi-static flexible symbol (X) may be indicated, via ssb-PositionsInBurst in ServingCell-ConfigCommon, for the reception of SS/PBCH blocks. In such examples, the UE may not use the semi static flexible symbol (X) allocated for synchronization signaling for an uplink (for example, PUSCH) transmission. In some examples, the UE may receive control signaling (for example, RRC signaling) that indicates one or more symbols allocated for a synchronization signal block within a slot that includes the semi-static flexible symbol 420, which falls within a time domain resource assignment. Due to the semi-static flexible symbol 420 being allocated for a synchronization signal block, the UE may determine to exclude the semi-static flexible symbol 420 from the subset of symbols scheduled for transmitting an uplink transmission of one or more data repetitions. The UE may skip transmitting the uplink transmission within the semi-static flexible symbol 420 (for example, due to overlap with the synchronization signal block), and may instead transmit the uplink transmission in the identified subset of the symbols within the time domain resource assignment that does not include the semi-static flexible symbol 420.

In some implementations, the UE may receive an uplink grant 220 that schedules a data transmission for the UE within the time domain resource assignment. The data transmission may in some examples have a defined latency condition, a defined reliability condition, or both (for example, the data transmission may be a URLLC transmission). In such implementations, the UE may not expect to receive control signaling (for example, via a physical downlink control channel (PDCCH)) that schedules the UE, for example, to receive a second data transmission on a semi-static flexible symbol from a set of symbols within the time domain resource used for transmitting data repetitions. For example, the UE may not expect to receive such control signaling either before or after receiving the uplink grant 220. In an example, the UE does not expect to be scheduled with a PDCCH, that is received before or after a PDCCH corresponding to URLLC PUSCH, to receive PDSCH on a subset of semi-static flexible symbols from the set of semi-static flexible symbols within the time domain resource assignment that is usable for PUSCH transmission.

In one example, a UE may receive a first PDCCH that includes an uplink scheduling grant 220 (for example, a URLLC PUSCH). Accordingly, the UE may not expect to be scheduled, either before or after receiving the grant 220 in the first PDCCH, with a second PDCCH that schedules the UE to receive a PDSCH on a subset of semi-static flexible symbols from the set of semi-static flexible symbols that is usable for PUSCH transmissions (for example, for one or more data repetitions).

In some implementations, the UE may receive an uplink grant 220 that schedules a first data transmission for the UE within the time domain resource assignment. The data transmission may in some examples have a defined latency condition and a defined reliability condition (for example, be a URLLC transmission). In such implementations, the UE may not receive control signaling that schedules the UE (for example, via PDCCH) to receive a second data transmission (for example, an eMBB transmission) on a semi-static flexible symbol from a set of symbols within the time domain resource assignment used for transmitting data repetitions. The UE may not expect to receive, and may not receive, such control signaling that schedules the second data transmission after receiving the uplink grant 220. In some aspects, the first data transmission may have a lower latency condition and a higher reliability than the second data transmission. In some other examples, the second data transmission may have a lower latency condition and a higher reliability condition than the first data transmission. For example, the UE may not expect to be scheduled by a PDCCH, that is received after the PDCCH scheduling URLLC PUSCH, to receive eMBB PDSCH on a subset of semi-static flexible symbols from the set of semi-static flexible symbols within the time domain resource assignment that is usable for PUSCH transmission.

In one example, the UE may receive a first PDCCH corresponding to an uplink grant 220 which schedules an uplink transmission (for example, a URLLC PUSCH). The UE may not expect to be scheduled with a second PDCCH that it may receive after the first PDCCH, the second PDCCH scheduling the UE to receive eMBB PDSCH on a subset of semi-static flexible symbols from the set of semi-static flexible symbols within the time domain resource assignment that is useable for PUSCH transmissions.

In some implementations, the uplink grant 220 may cancel a resource allocation within the time domain resource assignment that is indicated by a control message (for example, a PDCCH) that is received before the uplink grant. In some aspects, the uplink grant may be associated with a transmission with lower latency and higher reliability (for example, a URLLC transmission) than a transmission (for example, an eMBB transmission) associated with the earlier-received control message. For example, a UE may receive a first PDCCH which may schedule eMBB PDSCH on the subset of semi-static flexible symbols from the set of semi-static flexible symbols within the time domain resource assignment that is usable for PUSCH transmissions. After receiving the first PDCCH, the UE may receive a second PDCCH that includes an uplink grant 220 scheduling URLLC PUSCH. Accordingly, the first PDCCH scheduling eMBB PDSCH (which was received before the second PDCCH scheduling URLLC PUSCH) may be canceled by the URLLC grant 220 associated with the second PDCCH. In an example, a PDCCH, that is received before a PDCCH corresponding to URLLC PUSCH, and was scheduling eMBB PDSCH on a subset of semi-static flexible symbols from the set of semi-static flexible symbols that is usable for PUSCH transmission, may be cancelled by the URLLC grant received in the URLLC PUSCH.

Figure 5A:
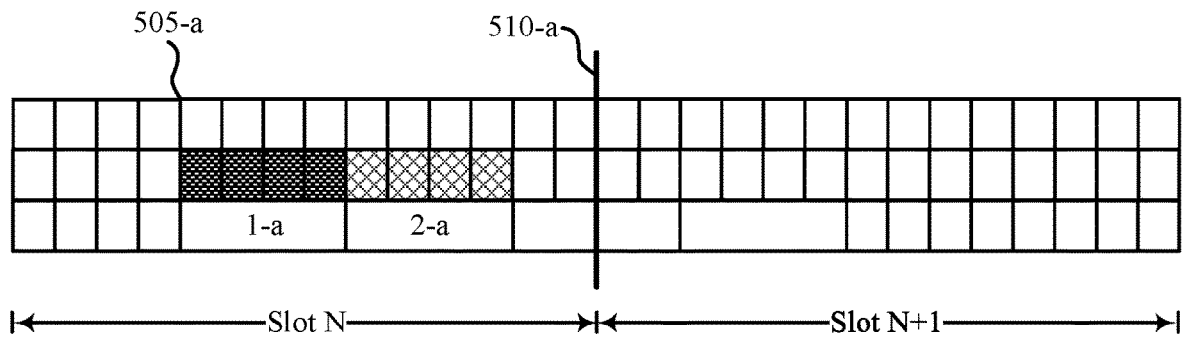
FIGS. 5A-5C illustrate examples of transmission schemes that support PUSCH repetition across slot boundary in accordance with aspects of the present disclosure.
Figure 5B:
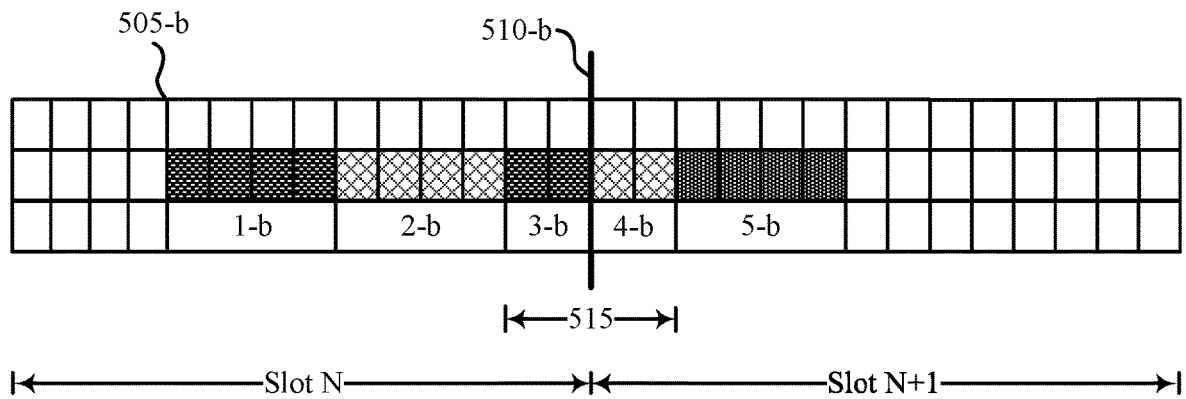
Figure 5C:
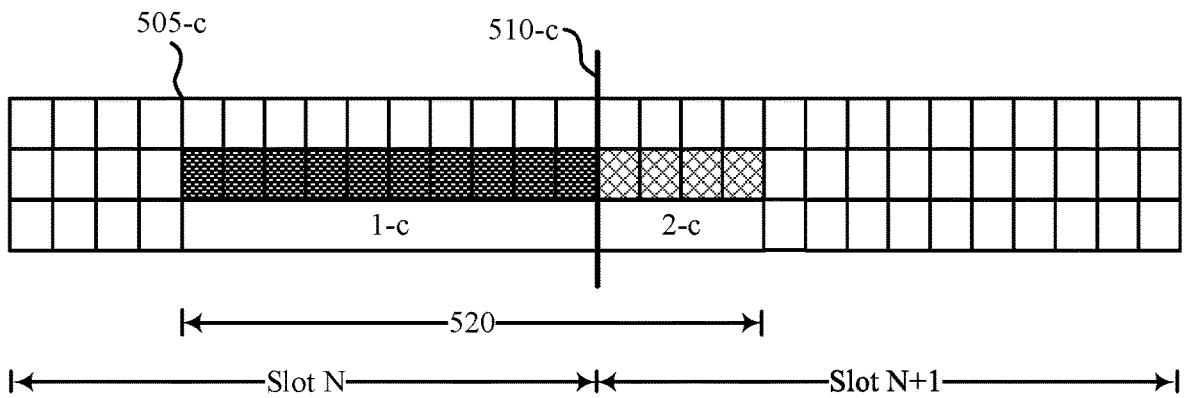

FIGS. 5A-5C illustrate examples of transmission schemes 500-*a*, 500-*b*, and 500-*c* that support PUSCH repetition across slot boundary in accordance with aspects of the present disclosure. The transmission schemes 500-*a*, 500-*b*, and 500-*c* may be implemented by a UE as part of a semi-static slot format indication for identifying directions for one or more symbols included in a transmission duration for example, as described with reference to FIGS. 1, 2, 3A, 3B, and 4A-4C. In addition, the transmission schemes 500-*a*, 500-*b*, and 500-*c* may include or more data repetitions associated with an uplink data payload for transmission, in some implementations, across a slot boundary.

In some implementations, a UE may receive an indication of one or more data repetitions associated with an uplink data payload. For example, the UE may receive a grant (for example, a downlink grant such as DCI, or a dynamic grant) which may include information about a transmission scheme. For example, the grant may include information such as a starting symbol location 505 (for example, a symbol index S), the length of each data repetition L (given by a number of symbols included in each data repetition), and the number of data repetitions K that may occur in the transmission. The UE may perform segmentation for repetitions that cross a slot boundary, and may skip performing segmentation for repetitions that do not cross a slot boundary. FIGS. 5A-5C are provided as non-limiting examples, and a number of other transmission schemes for transmitting various data payloads according to the techniques described herein may exist.

In the example of FIG. 5A, a UE may receive an indication of one or more data repetitions associated with an uplink payload. The UE may receive an indication (for example, in DCI) which indicates a starting symbol location 505-*a* corresponding to a symbol index of 4 (S=4), a data repetition duration of 4 symbols (L=4) and 2 data repetitions (K=2), corresponding to data repetitions 1-*a* and 2-*a*. In this example, the first and second data repetitions (data repetitions 1-*a* and 2-*a*) may end before crossing slot boundary 510-*a*, and thus the data repetitions may not be segmented. The UE may thus transmit data repetitions 1-*a* and 2-*a* within a same slot without segmentation, because neither of data repetitions 1-*a* and 2-*a* cross slot boundary 510-*a*.

In another example shown in FIG. 5B, the UE may receive an indication of one or more data repetitions associated with an uplink data payload. For example, the UE may receive a grant (for example, a downlink grant such as DCI, or a dynamic grant) which indicates an uplink scheduling which may include a starting symbol 505-*b* that corresponds to a symbol index of 4 (S=4), a data repetition duration of 4 symbols (L=4) and 4 data repetitions (K=4), corresponding to scheduled data repetitions 1-*b*, 2-*b*, 515, and 5-*b*. In this example, the four data repetitions are scheduled such that one of the one or more data repetitions (for example, the third data repetition 515) crosses the slot boundary 510-*b*. In such implementations, the data repetition 515 may be segmented into a number of subrepetitions due to the repetition 515 crossing the slot boundary 510-*b*. For example, the data repetition 515 (which may include four symbols) may be segmented into 2 subrepetitions 3-*b* and 4-*b* at slot boundary 510-*b*. In some examples, each subrepetition 3-*b* and 4-*b* may include 2 symbols. In some other examples, the number of symbols included in the subrepetitions may be different (for example, based on the location of the slot boundary). Subrepetition 3-*b* may include the data that is the same as in the first two symbol periods of data repetition 1-*b*, or any of the symbol periods of data repetition 1-*b*. Subrepetition 4-*b* may include the data that is the same as in the first two symbol periods of data repetition 1-*b*, or any of the symbol periods of data repetition 1-*b*. The UE may transmit data repetitions 1-*b* and 2-*b*, and subrepetition 3-*b*, within a first slot (for example, within slot N), and subrepetition 4-*b* and data repetition 5-*b* within a second slot (for example within slot N+1).

In another example shown in FIG. 5C, the UE may receive an indication of one or more data repetitions associated with an uplink data payload. For example, the UE may receive a grant (for example, a downlink grant such as DCI, or a dynamic grant) which indicates a starting symbol 505-*c* that corresponds to a symbol index of 4 (S=4), a data repetition duration of 14 symbols (L=14) and 1 data repetition (K=1) corresponding to data repetition 520. In this example, the single data repetition 520 may be 14 symbols in length, and may be scheduled such that the data repetition 520 crosses slot boundary 510-*c*. In such implementations, the data repetition may be segmented into a number of subrepetitions at the slot boundary 510-*c*. For example, the data repetition 520 may be segmented into 2 subrepetitions 1-*c* and 2-*c* at slot boundary 510-*c*. In the example of FIG. 5C, the first subrepetition 1-*c* may include 10 symbols and the second subrepetition 2-*c* may include 4 symbols. In some other examples, the number of symbols included in the subrepetitions 1-*c* and 2-*c* may be different (for example, based on the location of the slot boundary). The UE may thus transmit subrepetition 1-c within a first slot (for example, within slot N), and subrepetition 2-c within a second slot (for example within slot N+1).

Figure 6A:
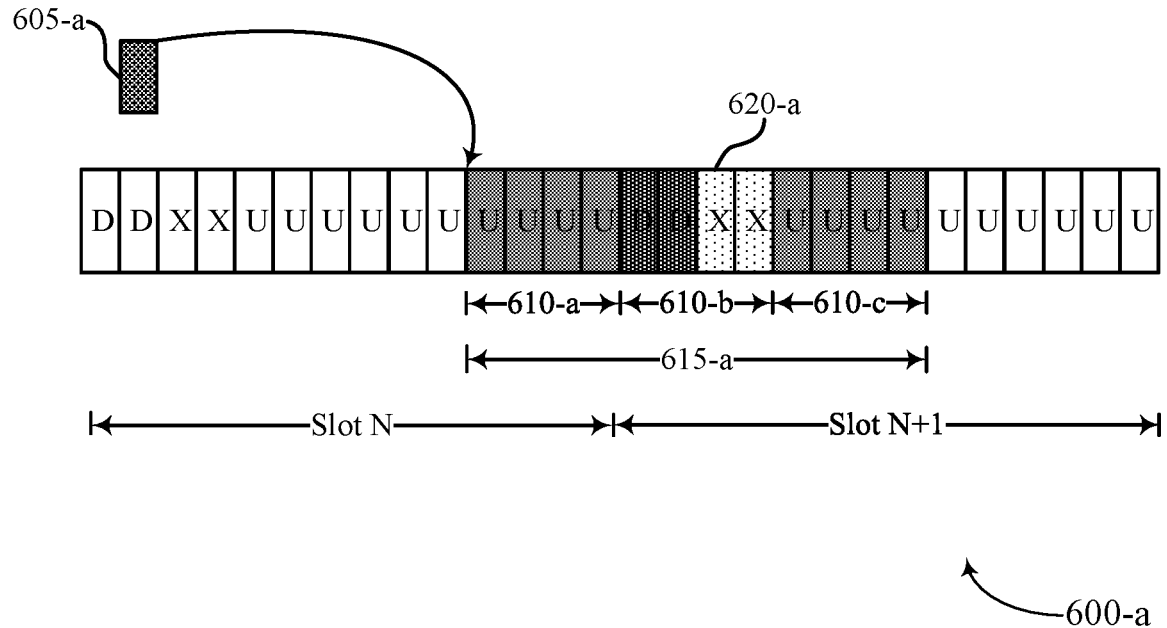
FIGS. 6A and 6B illustrate examples of transmission schemes that support PUSCH repetition across slot boundary in accordance with aspects of the present disclosure.
Figure 6B:
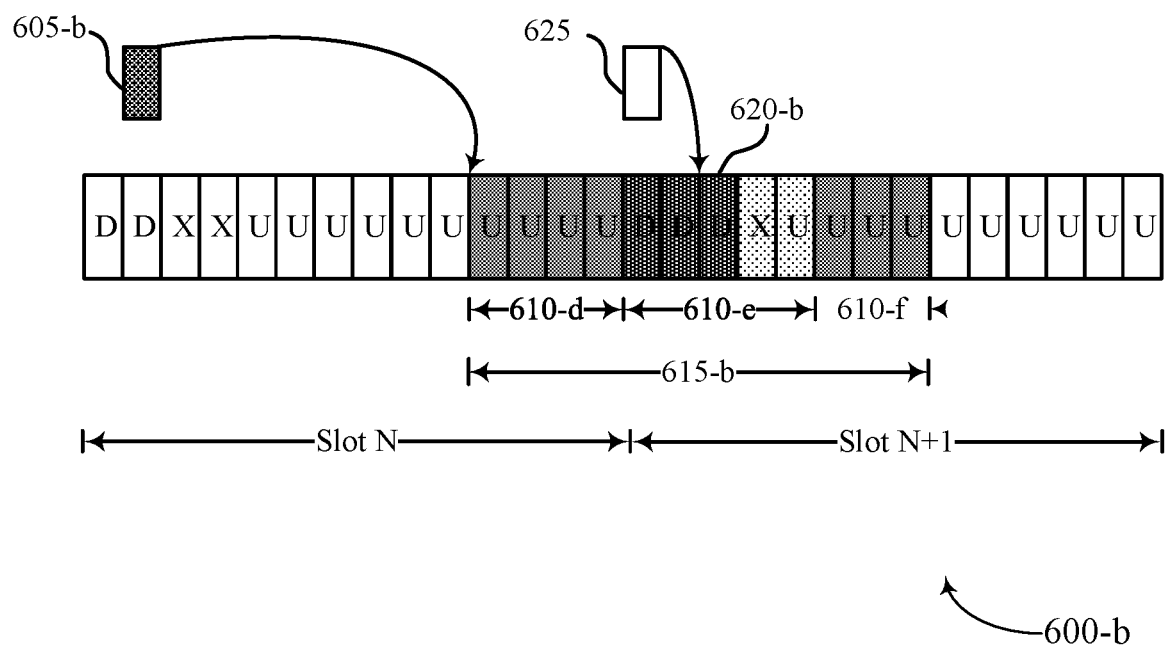

FIGS. 6A and 6B illustrate examples of transmission schemes 600-a and 600-b that support PUSCH repetition across slot boundary in accordance with aspects of the present disclosure. The transmission schemes 600-a and 600-b may be implemented by a UE as part of a semi-static or dynamic slot format indication for identifying directions for one or more symbols included in a transmission duration, as described with reference to FIGS. 1, 2, 3A, 3B, and 4A-4C. The semi-static or dynamic slot format indication may identify a set of uplink symbols for the one or more data repetitions. As described herein, each of the one or more slots included in a data frame may include uplink symbols, downlink symbols, and flexible symbols for communicating data traffic. In some examples, the UE may receive a semi-static or dynamic slot format indication (for example, that identifies slot formats for each slot of each frame).

In the example of FIG. 6A, the UE may receive information about the transmission scheme 600-a in a semi-static slot format indicator. In addition, the UE may receive a grant 605-a (for example, a URLLC grant) which may contain control information or scheduling information such as a DCI. The DCI in some examples may include an indication of an uplink scheduling associated with information such as the location of a starting symbol (for example, a symbol index) which may indicate the beginning of a scheduled transmission period. The DCI may further contain a number of data repetitions associated with the scheduled transmission period, and the length of each data repetition. In the example of FIG. 6A, a UE may receive a grant containing a starting symbol index of 10 (S=10), 3 data repetitions (K=3), and 4 symbols per data repetition (L=4).

In some implementations, a UE may receive a grant in a downlink transmission period indicating a transmission with a starting symbol that is close to a slot boundary (close, such that the transmission may be scheduled to cross the slot boundary). In the example shown in FIG. 6A, the grant 605-a may indicate a transmission period 615-a which may be 12 symbols in length and beginning at symbol index 10. The transmission period 615-a may be segmented according to information the UE may receive in DCI (for example, transmission 615-a may be segmented into 3 repetitions 610-a, 610-b, and 610-c, where each of the repetitions is 4 symbols in length). In some examples, the UE may determine to segment one or more of the repetitions 610-a, 610-b, and 610-c based on whether the repetition contains one or more semi-static downlink (D) symbol.

In some implementations, the UE may determine to skip or drop transmission of the repetition 610-b based on the downlink symbols contained in the repetition 610-b. For either multi-segment transmission or mini-slot repetition, a portion of the downlink symbols may be used, while other downlink symbols may not be used for the data repetitions 610-b. For example, some downlink symbols may carry additional signaling such as reference signals, synchronization signals, or broadcast channels, and may be skipped or dropped.

In some implementations, the flexible (X) symbols included in the repetition 610-b may not be used for transmitting uplink data, but may be used for a gap period that the UE may use between receiving downlink data and transmitting uplink data. In some examples, the gap period (beginning at flexible symbol 620-a) associated with the flexible symbols of repetition 610-b may be used for applying timing advance, accounting for timing alignment and switching between receiving and transmitting modes at the UE, or a combination thereof. Because the repetition 610-b contains downlink symbols and flexible symbols, the UE may determine that the repetition 610-b may not have symbols available to transmit uplink data. The UE may therefore determine to skip or drop transmission of the repetition 610-b based on the downlink symbols and the flexible symbols being configured within at least one symbol period of the repetition 610-b. Dropping transmission of the repetition 610-b may reduce transmission latency at the UE, in part because the UE may transmit uplink data using repetitions 610-a and 610-c without having to transmit repetition 610-b.

In the example of FIG. 6B, the UE may receive a grant 605-b (for example, a URLLC grant) which may contain DCI. The DCI may include an indication of an scheduled transmission period including information such as the location of a starting symbol (for example, a symbol index) which may indicate the beginning of a transmission period. The DCI may further contain an indication of a number of data repetitions and the length of each data repetition. In the example of FIG. 6B, the UE may receive a grant containing a starting symbol index of 10 (S=10), 3 data repetitions (K=3), and 4 symbols per data repetition (L=4).

In the example shown in FIG. 6B, the grant 605-b may indicate a transmission period 615-b which may be 12 symbols in length beginning at symbol index 10. The transmission period 615-b may be segmented according to information the UE may receive in DCI (for example, transmission 615-b may be segmented into 3 repetitions 610-d, 610-e, and 610-f, where each of the repetitions is 4 symbols in length). In some implementations, the UE may determine to segment one or more of the repetitions 610-d, 610-e, and 610-f based on one or more semi-static downlink (D) symbol or symbols within the repetition, or based on the location of the slot boundary of Slot N and Slot N+1.

In some implementations, the UE may receive a second grant 625 in the second repetition 610-e. In some implementations, the second grant 625 may be a dynamic grant (for example, the second grant 625 may contain a dynamic slot format indicator) which may indicate the first flexible symbol 620-b of the second repetition 610-e to be allocated as a downlink (D) symbol. In some examples, the second grant 625 may indicate to change the semi-static configuration of the first flexible symbol (for example, flexible symbol 620-a, as described with reference to FIG. 6A) to a downlink symbol 620-b. In some examples, the semi-static slot format indication may be overwritten by a dynamic slot format indication. A dynamic slot format indication may indicate the slot format for the slot in which it is received, as well as for one or more additional slots. In some implementations, the dynamic slot format indication may be transmitted using a signaling scheme that has a lower reliability (for example, block error rate) than a target reliability for a traffic type of the data to be transmitted (for example, URLLC).

After receiving the dynamic slot format indication, the UE may still use two slots for a gap period between downlink and uplink slots in the transmission period 615-b. In such examples, the UE may shift the gap period such that the UE may use the first uplink (U) slot of the third repetition 610-f as part of the gap period, in addition to the second flexible slot in the second repetition 610-e. As a result, the second repetition 610-e may include a total of five slots (three slots allocated for downlink (D) and two slots allocated for the gap period), and the third repetition 610-f may include three slots allocated for uplink (U).

In some other implementations, the UE may ignore the dynamic slot format indication for data transmissions associated with some traffic types such as URLLC, and in some examples, eMBB. In some implementations, the UE may determine to ignore the second dynamic grant 625. For example, for implementations where the UE receives a first grant 605-*b* (which may be a URLLC grant), the UE may ignore dynamic SFI for URLLC traffic. In some implementations, the UE may ignore the second grant 625 regardless of when the grant is received. For example, the UE may ignore the second dynamic grant 625 that reallocates the semi-static flexible symbol 620-*a* as a downlink symbol 620-*b*, no matter if the other grant (the second dynamic grant 625) comes before or after the UL URLLC grant 605-*b*. In such implementations, the UE may not rely on the dynamic slot format indicator to determine the direction of the semi-static flexible (X) symbols. Further, in addition to semi-statically configured uplink (U) symbols, semi-static flexible (X) symbols may also be considered as uplink (U) symbols.

In some implementations where the UE receives a first grant 605-*b* which schedules a subsequent transmission period containing one or more repetitions, the UE may not expect to receive a second grant 625 that changes the direction of a symbol, either before or after receiving the first grant. For example, the UE may not expect to get a dynamic grant (after or before the UL URLLC grant) that reallocates semi-static flexible symbol 620-*a* to a downlink symbol 620-*b*. In such examples, not expecting may be associated with given UE behavior. For example, not expecting may mean that if the gNB does such an allocation, it will be an error case in UE (for example, UE behavior is not defined), so the UE may not expect to receive such a dynamic grant after/before the UL URLLC grant 605-*b*.

Figure 7:
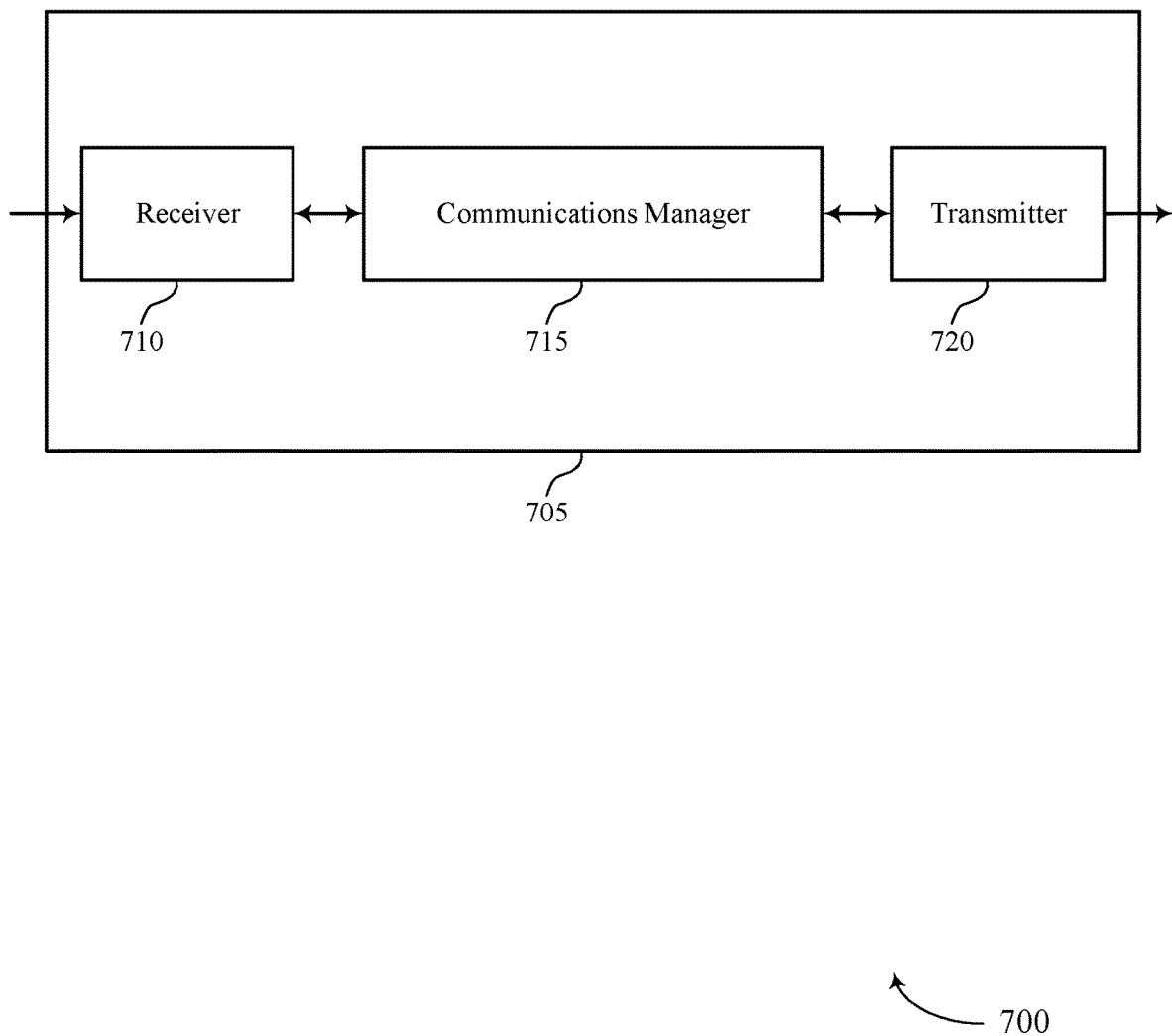
FIGS. 7 and 8 illustrate block diagrams of devices that support PUSCH repetition across slot boundary in accordance with aspects of the present disclosure.

FIG. 7 shows a block diagram 700 of a device 705 that supports physical uplink shared channel repetition across slot boundary in accordance with aspects of the present disclosure. The device 705 may be an example of aspects of a UE 115 as described herein. The device 705 may include a receiver 710, a communications manager 715, and a transmitter 720. The device 705 can be implemented, at least in part, by one or both of a modem and a processor. Each of these components may be in communication with one another (for example, via one or more buses).

The receiver 710 may receive information such as packets, user data, or control information associated with various information channels (for example, control channels, data channels, and information related to physical uplink shared channel repetition across slot boundary, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may receive, from a base station, signaling including an uplink grant for one or more data repetitions, the uplink grant including a time domain resource assignment that spans a set of slots for the one or more data repetitions, identify directions for a plurality of symbols within the time domain resource assignment, determine a subset of the plurality of symbols for scheduling the one or more data repetitions based on the identified directions for the plurality of symbols, and transmit, to the base station, the one or more data repetitions over the subset of the plurality of symbols. The communications manager 715 may be an example of aspects of the communications manager 1010 described herein.

The communications manager 715, or its sub-components, may be implemented in hardware, code (for example, software or firmware) executed by a processor, or any combination thereof. If implemented in code executed by a processor, the functions of the communications manager 715, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 715, or its sub-components, may be physically located at different locations, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver component. For example, the transmitter 720 may be an example of aspects of the transceiver 1020 described with reference to FIG. 10. The transmitter 720 may utilize a single antenna or a set of antennas.

Figure 8:
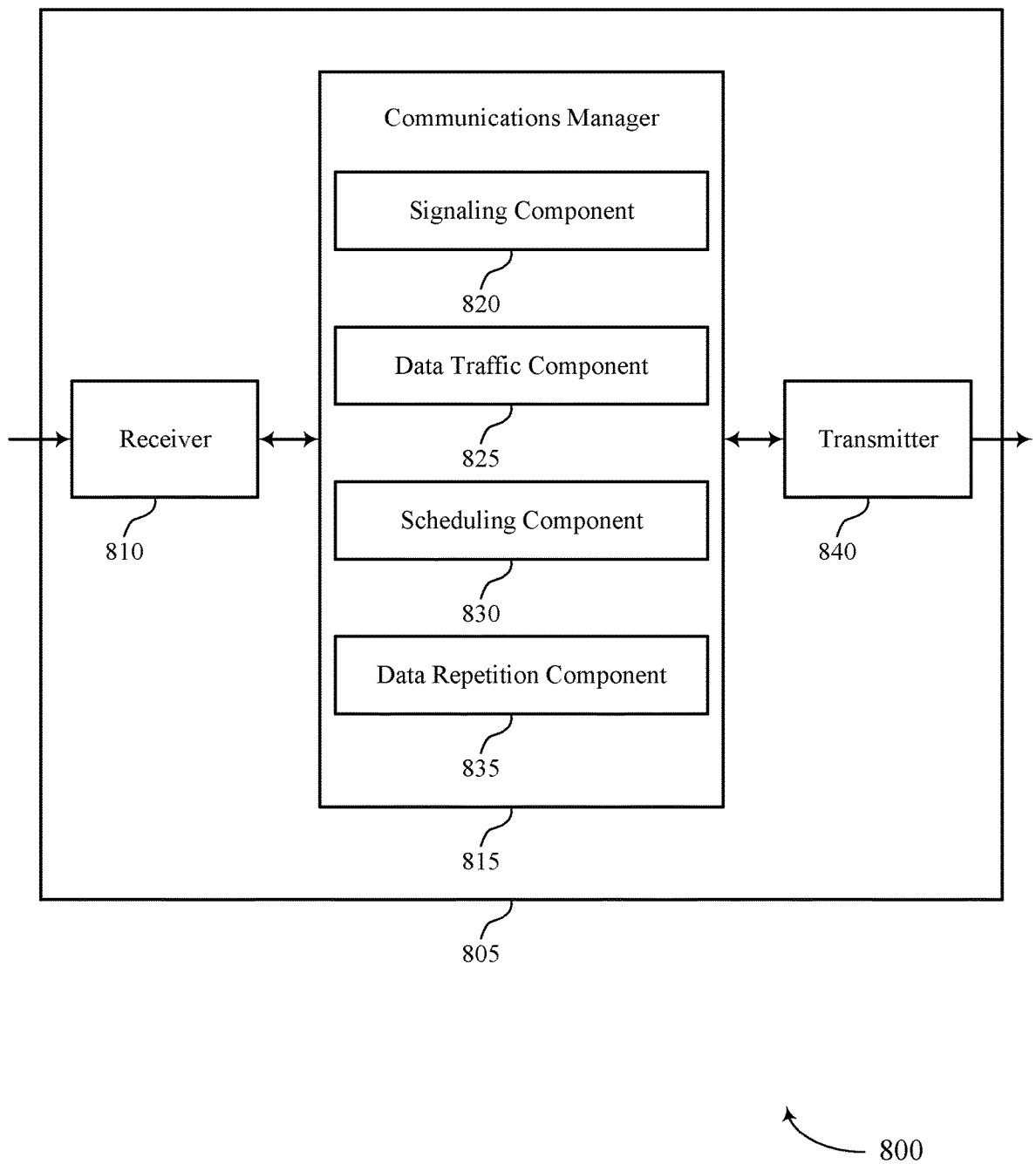

FIG. 8 shows a block diagram 800 of a device 805 that supports physical uplink shared channel repetition across slot boundary in accordance with aspects of the present disclosure. The device 805 may be an example of aspects of a device 705, or a UE 115 as described herein. The device 805 may include a receiver 810, a communications manager 815, and a transmitter 840. The device 805 may be implemented, at least in part, by one or both of a modem and a processor. Each of these components may be in communication with one another (for example, via one or more buses).

The receiver 810 may receive information such as packets, user data, or control information associated with various information channels (for example, control channels, data channels, and information related to physical uplink shared channel repetition across slot boundary, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a signaling component 820, a data traffic component 825, a scheduling component 830, and a data repetition component 835. The communications manager 815 may be an example of aspects of the communications manager 1010 described herein.

The signaling component 820 may receive, from a base station, signaling including an uplink grant for one or more data repetitions, the uplink grant including a time domain resource assignment that spans a set of slots for the one or more data repetitions. In some cases, the signaling component 820 may be configured to receive and transmit information.

The data traffic component 825 may identify directions for a plurality of symbols within the time domain resource assignment.

The scheduling component 830 may determine a subset of the plurality of symbols for scheduling the one or more data repetitions based on the identified directions for the one or more symbols. The data repetition component 835 may transmit, to the base station, the one or more data repetitions over the subset of the one or more symbols.

The transmitter 840 may transmit signals generated by other components of the device 805. In some examples, the transmitter 840 may be collocated with a receiver 810 in a transceiver component. For example, the transmitter 840 may be an example of aspects of the transceiver 1020 described with reference to FIG. 10. The transmitter 840 may utilize a single antenna or a set of antennas.

In some examples, communications manager 815 may be implemented as an integrated circuit or chipset for a mobile device modem, and the receiver 810 and transmitter 840 may be implemented as analog components (e.g., amplifiers, filters, antennas, etc.) coupled with the mobile device modem to enable wireless transmission and reception.

The communications manager 815 as described herein may be implemented to realize one or more potential advantages. Various implementations may enable communications manager 815 to transmit data using a number of repetitions around a slot boundary. At least one implementation may enable the communications manager 815 to reduce communications latency by transmitting an uplink data payload according to defined latency or reliability targets. At least one implementation may enable communications manager 815 to skip or drop transmissions that are determined as lower priority than a different transmission.

Based on implementing the techniques described herein, one or more processors of the device 805 (e.g., processor(s) controlling or incorporated with one or more of receiver 810, communications manager 815, and transmitter 840) may reduce an amount of time to transmit data using a number of data repetitions. In addition, the components may effectively reduce latency for transmitting the uplink data payload.

Figure 9:
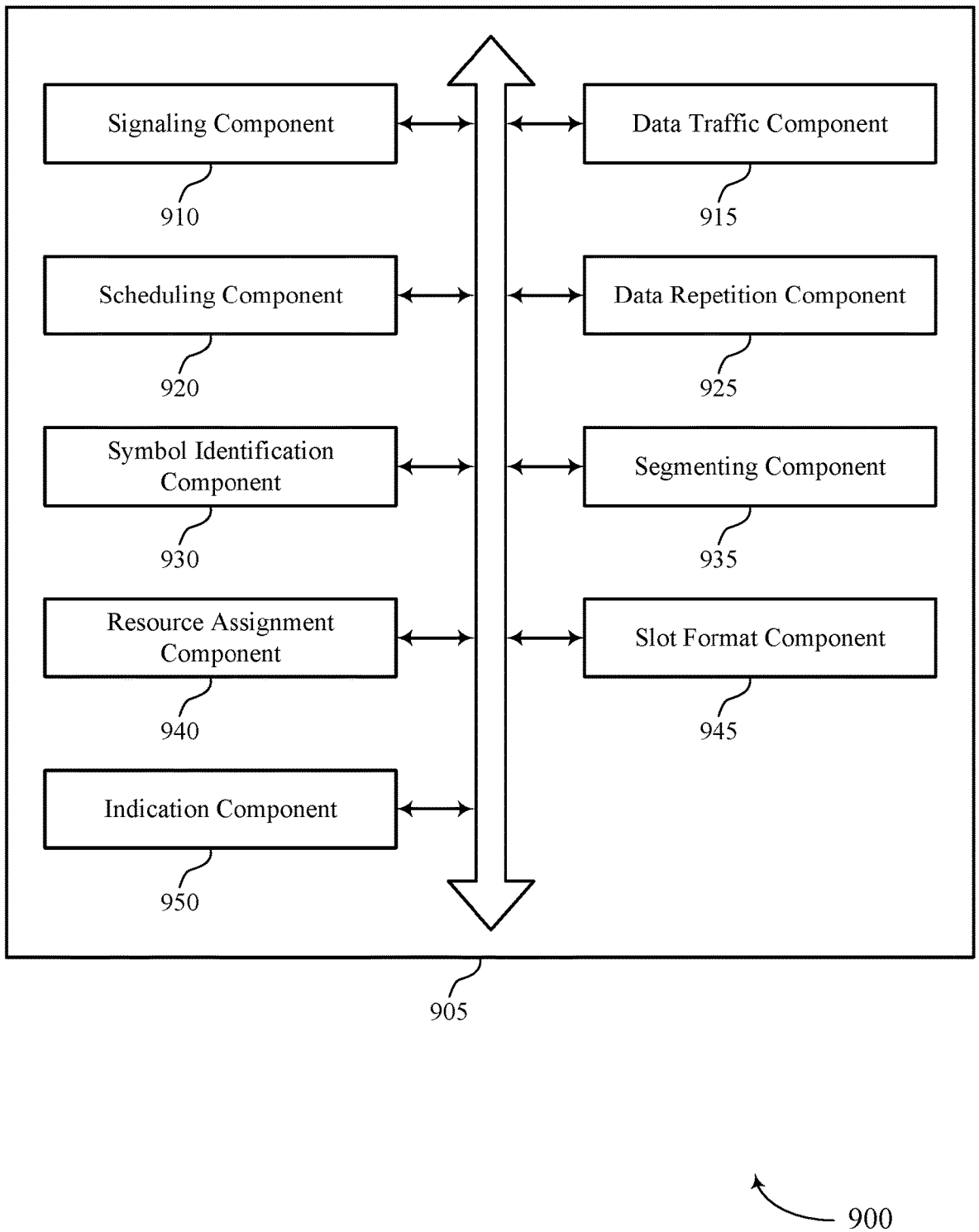
FIG. 9 illustrates a block diagram of a communications manager that supports PUSCH repetition across slot boundary in accordance with aspects of the present disclosure.

FIG. 9 shows a block diagram 900 of a communications manager 905 that supports physical uplink shared channel repetition across slot boundary in accordance with aspects of the present disclosure. The communications manager 905 may be an example of aspects of a communications manager 715, a communications manager 815, or a communications manager 1010 described herein. The communications manager 905 may include a signaling component 910, a data traffic component 915, a scheduling component 920, a data repetition component 925, a symbol identification component 930, a segmenting component 935, a resource assignment component 940, a slot format component 945, and an indication component 950. Each of these components may communicate, directly or indirectly, with one another (for example, via one or more buses).

The signaling component 910 may receive, from a base station, signaling including an uplink grant for one or more data repetitions, the uplink grant including a time domain resource assignment for the one or more data repetitions. In some examples, the signaling component 910 may skip transmission of the first repetition within the one or more symbols of the subset allocated for transmission of the first repetition. In some examples, the signaling component 910 may transmit the set of data subrepetitions within the one or more symbols of the subset allocated for transmission of the first repetition.

In some examples, the signaling component 910 may receive a dynamic grant that reallocates a semi-static flexible symbol, within one or more symbols of the subset allocated for transmission of a first repetition of the one or more data repetitions, to a downlink symbol. In some examples, the signaling component 910 may determine to ignore the dynamic grant based on receiving the signaling including the uplink grant, where the dynamic grant is received before or after the uplink grant.

In some examples, the signaling component 910 may receive the signaling including the uplink grant that indicates a repetition length and a number of repetitions, where the one or more data repetitions are transmitted over the subset of the one or more symbols based on the repetition length and the number of repetitions. In some examples, the signaling component 910 may receive a second grant including a second time domain resource assignment associated with the second traffic type.

In some implementations, the UE does not expect to receive, before or after receiving the uplink grant, a dynamic grant that reallocates a semi-static flexible symbol, within one or more symbols of the subset allocated for transmission of a first repetition of the one or more data repetitions, to a downlink symbol.

The data traffic component 915 may identify directions for one or more symbols within a set of slots based on the time domain resource assignment.

The scheduling component 920 may determine a subset of the one or more symbols for scheduling the one or more data repetitions based on the identified directions for the one or more symbols.

In some examples, the scheduling component 920 may identify, based on the second grant, a second subset of the one or more symbols for scheduling a data communication of the second traffic type based on the directions for the one or more symbols identified based on the first dynamic slot format indication.

In some examples, the scheduling component 920 may identify, based on the second grant, a second subset of the one or more symbols for scheduling a data communication of the second traffic type based on the directions for the one or more symbols identified based on the second dynamic slot format indication. In some implementations, the uplink grant includes an indication of availability of downlink symbols or flexible symbols for the one or more data repetitions. In some implementations, the determining the subset of the one or more symbols for scheduling the one or more data repetitions is based on the indication.

In some examples, the first dynamic slot format indication is inconsistent with the second dynamic slot format indication, and where the identifying the directions for the one or more symbols is based on a semi-static slot format indication or a dynamic slot format indication.

The data repetition component 925 may transmit, to the base station, the one or more data repetitions over the subset of the one or more symbols.

In some examples, the data repetition component 925 may determine a repetition length for the one or more data repetitions based on a duration between a starting symbol of the time domain resource assignment and a last symbol of a first slot of the set of slots.

In some examples, the data repetition component 925 may determine a number of repetitions for the one or more data repetitions based at least in part the repetition length and a transmission duration of the time domain resource assignment.

In some examples, the data repetition component 925 may determine a repetition format from a set of repetition formats for the one or more data repetitions, the set of repetition formats including a first repetition format having one or more repetitions of an indicated mini-slot duration in each of the set of slots and a second repetition format including a single repetition for each set of contiguous uplink symbols for each of the set of slots.

In some examples, the data repetition component 925 may determine the repetition format is based on an indicator in the uplink grant of the first repetition format or the second repetition format for the one or more data repetitions. In some examples, the data repetition component 925 may receive a first slot format indication indicating downlink symbols of the set of slots. In some examples, the data repetition component 925 may receive a second slot format indication indicating uplink symbols of the set of slots.

In some examples, determining the subset of the one or more symbols for scheduling the one or more data repetitions includes including in the subset of the one or more symbols a symbol indicated as a downlink symbol in the first slot format indication and indicated as an uplink symbol in the second slot format indication.

In some implementations, the determining the repetition format is based on comparing a transmission duration of the time domain resource assignment for the one or more data repetitions with a threshold duration.

The symbol identification component 930 may identify at least one semi-statically configured downlink symbol within one or more symbols of the subset allocated for transmission of a first repetition of the one or more data repetitions.

The segmenting component 935 may segment the first repetition. In some examples, segmenting a first repetition of the one or more data repetitions into a set of data subrepetitions based on identifying that one or more symbols of the subset allocated for transmission of the first repetition crosses a slot boundary between consecutive slots of the set of slots, where transmitting the one or more data repetitions includes transmitting the set of data subrepetitions within the one or more symbols of the subset allocated for transmission of the first repetition, and transmitting the one or more data repetitions over the subset of the one or more symbols.

The data traffic component 915 may identify directions for one or more symbols within a set of slots. In some implementations, a transmission duration of the time domain resource assignment indicates a contiguous set of symbols corresponding to the one or more symbols. In some implementations, a transmission duration of the time domain resource assignment indicates a duration of the subset of the one or more symbols, the subset of the one or more symbols corresponding to symbols configured for uplink transmission within the one or more symbols.

The slot format component 945 may receive a semi-static slot format indication, where the identifying the directions for the one or more symbols is based on the semi-static slot format indication for the set of slots regardless of a presence of a dynamic slot format indication associated with at least one of the set of slots.

In some examples, the slot format component 945 may receive a second grant including a second time domain resource assignment associated with a second traffic type. In some examples, the slot format component 945 may identify a second subset of the one or more symbols for scheduling a data communication over the second time domain resource assignment based on the dynamic slot format indication. In some examples, the slot format component 945 may receive a first dynamic slot format indication for at least one of the set of slots associated with a first traffic type. The first traffic type may in some examples be a low latency traffic type, or a high data rate traffic type. In some examples, the slot format component 945 may receive a second dynamic slot format indication for at least one of the set of slots associated with a second traffic type. In some examples, the second traffic type may be associated with higher latency than the first traffic type.

In some examples, the slot format component 945 may receive a first dynamic slot format indication for at least one slot of the set of slots associated with a first traffic type, and may receive a second dynamic slot format indication for at least one slot of the set of slots associated with a second traffic type, where the one or more data repetitions are associated with the first traffic type and the identifying the directions for the one or more symbols is based on the first dynamic slot format indication.

In some implementations, the identifying the directions for the one or more symbols includes identifying a set of uplink symbols for the one or more data repetitions corresponding to uplink symbols in the semi-static slot format indication.

In some implementations, the identifying the directions for the one or more symbols includes identifying a set of uplink symbols for the one or more data repetitions corresponding to uplink symbols and flexible symbols in the semi-static slot format indication.

In some implementations, the identifying the directions for the one or more symbols includes identifying a set of uplink symbols for the one or more data repetitions corresponding to uplink symbols, flexible symbols, and at least one downlink symbol in the semi-static slot format indication.

In some implementations, the dynamic slot format indication converts a flexible symbol of the semi-static slot format indication to a downlink symbol. In some implementations, the dynamic slot format indication is received within or prior to a first slot of the set of slots. In some implementations, the dynamic slot format indication is received in a group-common physical downlink control channel (GC-PDCCH) message. In some implementations, the semi-static slot format indication is a first semi-static slot format indication associated with a first traffic type, in which the slot format component 945 may receive a second semi-static slot format indication associated with a second traffic type. The indication component 950 may indicate a semi-static slot format indication for identifying directions for one or more symbols within a set of slots.

In some implementations, the uplink grant includes a dynamic slot format indication associated with at least one of the set of slots. In some implementations, the identifying the directions for the one or more symbols is based on the dynamic slot format indication. In some implementations, the uplink grant identifies one of the set of slot format patterns for the at least one of the set of slots. In some implementations, the set of slot format patterns are received via RRC signaling.

Figure 10:
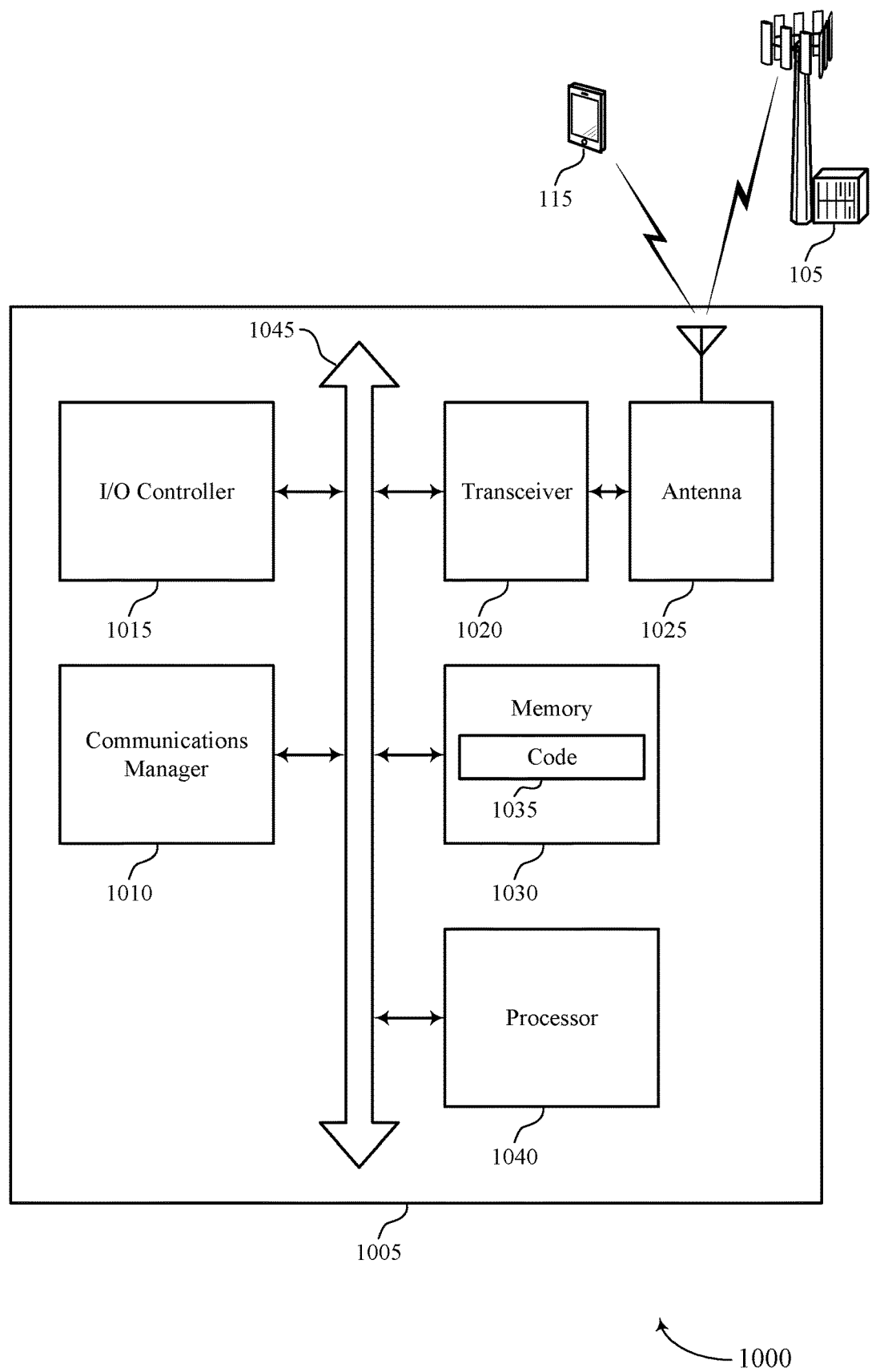
FIG. 10 illustrates a diagram of a system including a device that supports PUSCH repetition across slot boundary in accordance with aspects of the present disclosure.

FIG. 10 shows a diagram of a system 1000 including a device 1005 that supports physical uplink shared channel repetition across slot boundary in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (for example, bus 1045).

The communications manager 1010 may receive, from a base station, signaling including an uplink grant for one or more data repetitions, the uplink grant including a time domain resource assignment that spans a set of slots for the one or more data repetitions, identify directions for one or more symbols based on the time domain resource assignment, determine a subset of the one or more symbols for scheduling the one or more data repetitions based on the identified directions for the one or more symbols, and transmit, to the base station, the one or more data repetitions over the subset of the one or more symbols.

The I/O controller 1015 may manage input and output signals for the device 1005. The I/O controller 1015 may also manage peripherals not integrated into the device 1005. In some implementations, the I/O controller 1015 may represent a physical connection or port to an external peripheral. In some implementations, the I/O controller 1015 may utilize an operating system such as iOS®, ANDROID®, MS-DOS®, MS-WINDOWS®, OS/2®, UNIX®, LINUX®, or another known operating system. In other implementations, the I/O controller 1015 may represent or interact with a modem, a keyboard, a mouse, a touchscreen, or a similar device. In some implementations, the I/O controller 1015 may be implemented as part of a processor. In some implementations, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may be implemented, at least in part, by one or both of a modem and a processor to modulate the packets and provide the modulated packets to the antennas for transmission, and to demodulate packets received from the antennas.

In some implementations, the wireless device may include a single antenna 1025. However, in some implementations the device may have more than one antenna 1025, which may be capable of concurrently transmitting or receiving multiple wireless transmissions.

The memory 1030 may include RAM and ROM. The memory 1030 may store computer-readable, computer-executable code 1035 including instructions that, when executed, cause the processor to perform various functions described herein. In some implementations, the memory 1030 may contain, among other things, a BIOS which may control basic hardware or software operation such as the interaction with peripheral components or devices.

The processor 1040 may include an intelligent hardware device, (for example, a general-purpose processor, a DSP, a CPU, a microcontroller, an ASIC, an FPGA, a programmable logic device, a discrete gate or transistor logic component, a discrete hardware component, or any combination thereof). In some implementations, the processor 1040 may be configured to operate a memory array using a memory controller. In other implementations, a memory controller may be integrated into the processor 1040. The processor 1040 may be configured to execute computer-readable instructions stored in a memory (for example, the memory 1030) to cause the device 1005 to perform various functions (for example, functions or tasks supporting physical uplink shared channel repetition across slot boundary).

The code 1035 may include instructions to implement aspects of the present disclosure, including instructions to support wireless communications. The code 1035 may be stored in a non-transitory computer-readable medium such as system memory or other type of memory. In some implementations, the code 1035 may not be directly executable by the processor 1040 but may cause a computer (for example, when compiled and executed) to perform functions described herein.

Figure 11:
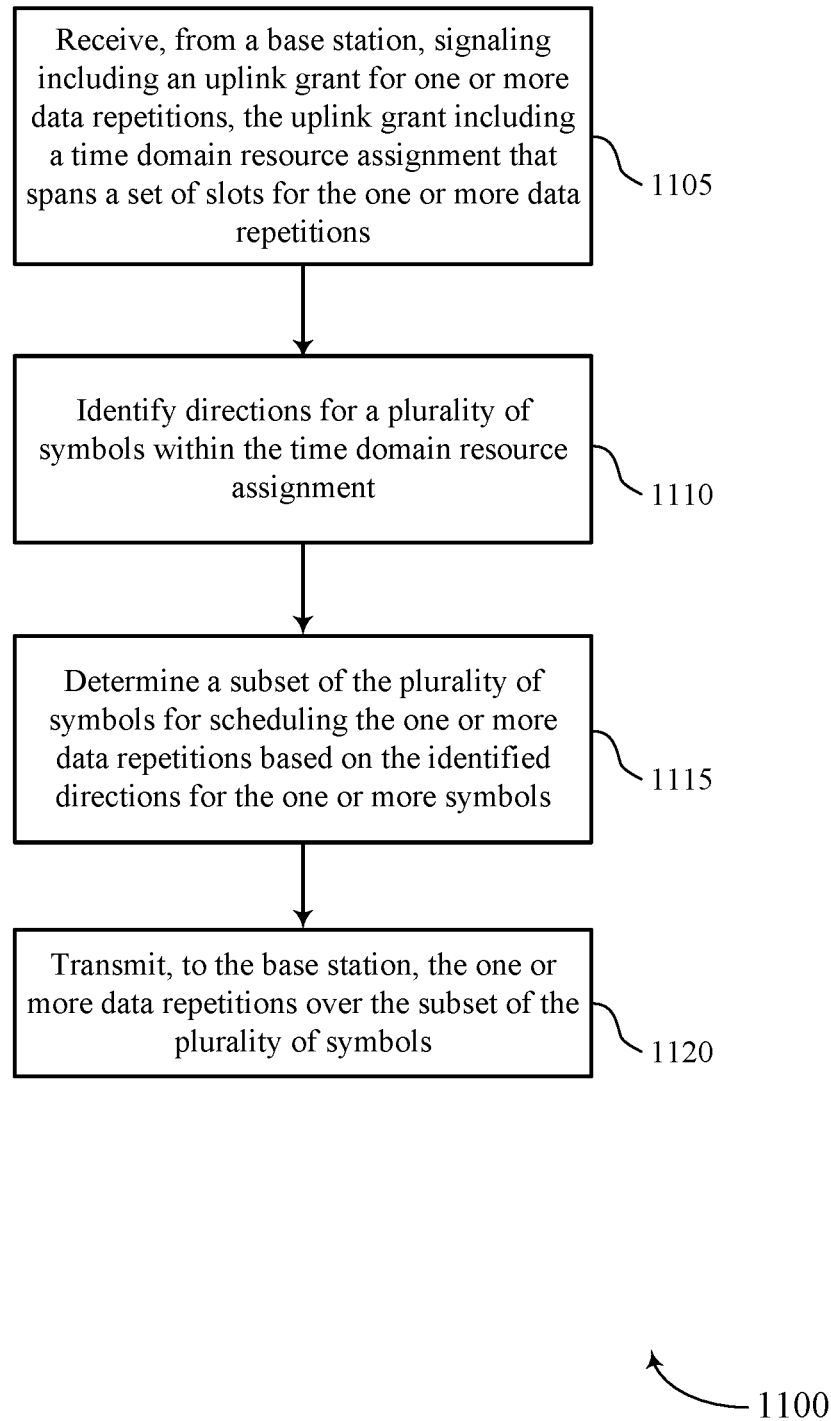
FIGS. 11-17 illustrate flowcharts illustrating methods that support PUSCH repetition across slot boundary in accordance with aspects of the present disclosure.

FIG. 11 shows a flowchart illustrating a method 1100 that supports physical uplink shared channel repetition across slot boundary in accordance with aspects of the present disclosure. The operations of method 1100 may be implemented by a UE 115 or its components as described herein. For example, the operations of method 1100 may be performed by a communications manager as described with reference to FIGS. 7-10. In some examples, a UE may execute a set of instructions to control the functional elements of the UE to perform the functions described below. Additionally or alternatively, a UE may perform aspects of the functions described below using special-purpose hardware.

At 1105, the UE may receive, from a base station, signaling including an uplink grant for one or more data repetitions, the uplink grant including a time domain resource assignment that spans a set of slots for the one or more data repetitions. The operations of 1105 may be performed according to the methods described herein. In some examples, aspects of the operations of 1105 may be performed by a signaling component as described with reference to FIGS. 7-10.

At 1110, the UE may identify directions for a plurality of symbols within the time domain resource assignment. In some examples, the identifying may include the following operations that may be performed individually or in any combination. In some examples, the identifying may include receiving control signaling that indicates a semi-static slot format indication for a slot that includes the semi-static flexible symbol. In some examples, the identifying may include receiving control signaling that indicates a semi-static slot format indication for a slot that includes the semi-static flexible symbol, where the semi-static slot format indication is received through a medium access control-control element which indicates one or more symbols for uplink transmission of the one or more data repetitions. In some examples, the control signaling comprises at least one of: downlink control information, a medium access control-control element, or radio resource control signaling. The operations of 1110 may be performed according to the methods described herein. In some examples, aspects of the operations of 1110 may be performed by a data traffic component as described with reference to FIGS. 7-10.

In some implementations, the UE may receive a semi-static slot format indication, wherein the identifying the directions for the plurality of symbols is based at least in part on the semi-static slot format indication for the plurality of slots regardless of a presence of a dynamic slot format indication associated with at least one of the plurality of slots. In some examples, the semi-static slot format indication is a first semi-static slot format indication associated with a first traffic type, the method further comprising receiving a second semi-static slot format indication associated with a second traffic type.

In some implementations, the uplink grant comprises a dynamic slot format indication associated with at least one of the plurality of slots; and the identifying the directions for the plurality of symbols is based at least in part on the dynamic slot format indication. In some implementations, the dynamic slot format indication converts a flexible symbol of the semi-static slot format indication to a downlink symbol. In some examples, the dynamic slot format indication is received within or prior to a first slot of the plurality of slots. In some examples, the dynamic slot format indication is received in a group-common physical downlink control channel (GC-PDCCH) message.

In some other implementations, the UE may receive a first dynamic slot format indication for at least one of the plurality of slots associated with a first traffic type, and may receive a second dynamic slot format indication for at least one of the plurality of slots associated with a second traffic type, where one or more data repetitions are associated with the first traffic type and the identifying the directions for the plurality of symbols is based at least in part on the first dynamic slot format indication. In some examples, the first dynamic slot format indication is inconsistent with the second dynamic slot format indication, and wherein the identifying the directions for the plurality of symbols is based at least in part on a semi-static slot formation or a dynamic slot format indication.

In some implementations, the UE may receive a second grant comprising a second time domain resource assignment associated with the second traffic type, and may identify based at least in part on the second grant, a second subset of the plurality of symbols for scheduling a data communication of the second traffic type based at least in part on the directions for the plurality of symbols identified based at least in part on the first dynamic slot format indication At 1115, the UE may determine a subset of the plurality of symbols for scheduling the one or more data repetitions based on the identified directions for the plurality of symbols. In some examples, the determining may include the following operations individually or in any combination. For example, the determining may include identifying a semi-static flexible symbol of the plurality of symbols that is a guard symbol that occurs between an ending symbol allocated for downlink reception within the plurality of symbols and a beginning symbol allocated for uplink transmission within the plurality of symbols, wherein the subset of the plurality of symbols excludes the semi-static flexible symbol. The determining may further include identifying a semi-static flexible symbol of the plurality of symbols that is included within a common search space for a defined control resource set, wherein the subset of the plurality of symbols excludes the semi-static flexible symbol, and receiving control signaling indicating one or more symbols allocated to the common search space for the defined control resource set. The determining may further comprise identifying a semi-static flexible symbol of the plurality of symbols that is allocated for a synchronization signal block, wherein the subset of the plurality of symbols excludes the semi-static flexible symbol, and receiving control signaling indicating one or more symbols allocated for the synchronization signal block or receiving control signaling that indicates a semi-static slot format indication for a slot that includes the semi-static flexible symbol.

In some additional examples, the determining may include identifying a set of uplink symbols for the one or more data repetitions corresponding to uplink symbols in the semi-static slot format indication. The determining may include identifying a set of uplink symbols for the one or more data repetitions corresponding to uplink symbols and flexible symbols in the semi-static slot format indication. The determining may include identifying a set of uplink symbols for the one or more data repetitions corresponding to uplink symbols, flexible symbols, and at least one downlink symbol in the semi-static slot format indication.

In some implementations, the uplink grant comprises an indication of availability of downlink symbols or flexible symbols for the one or more data repetitions, and the determining the subset of the plurality of symbols for scheduling the one or more data repetitions is based at least in part on the indication.

In some other implementations, the UE may receive a first slot format indication indicating downlink symbols of the plurality of slots, may receive a second slot format indication indicating uplink symbols of the plurality of slots. In some cases, the determining the subset of the plurality of symbols for scheduling the one or more data repetitions comprises including in the subset of the plurality of symbols a symbol indicated as a downlink symbol in the first slot format indication and indicated as an uplink symbol in the second slot format indication.

In some examples, the UE may not receive a first control message, before or after receiving the uplink grant scheduling a first data transmission having a defined latency condition and a defined reliability condition within the time domain resource assignment, that schedules the UE to receive a second data transmission on a semi-static flexible symbol from a set of one or more semi-static flexible symbols within the time domain resource assignment that is usable for transmitting the one or more data repetitions. In some other examples, the UE does not receive a first control message, after receiving the uplink grant scheduling a first data transmission within the time domain resource assignment, that schedules the UE to receive a second data transmission on a semi-static flexible symbol from a set of one or more semi-static flexible symbols within the time domain resource assignment that is usable for transmitting the one or more data repetitions, the first data transmission having a lower latency condition and a higher reliability condition than the second data transmission. In some examples, the uplink grant cancels a resource allocation by a second control message that is received before the uplink grant, the second control message scheduling a third data transmission within at least one semi-static flexible symbol from a set of one or more semi-static flexible symbols within the time domain resource assignment that is usable for transmitting the one or more data repetitions, the first data transmission having a lower latency condition and a higher reliability condition than the third data transmission.

In some implementations, the UE may identify at least one semi-statically configured downlink symbol within one or more symbols of the subset allocated for transmission of a first repetition of the one or more data repetitions, and may segment the first repetition. The segmenting may include skipping transmission within at least one semi-statically configured downlink symbol of the subset allocated for transmission of the first repetition.

In some implementations, the UE may segment a first repetition of the one or more data repetitions into a plurality of data subrepetitions based at least in part on identifying that one or more symbols of the subset allocated for transmission of the first repetition crosses a slot boundary between consecutive slots of the plurality of slots, wherein transmitting the one or more data repetitions comprises transmitting the plurality of data subrepetitions within the one or more symbols of the subset allocated for transmission of the first repetition.

In some implementations, the UE may receive a dynamic grant that reallocates a semi-static flexible symbol, within one or more symbols of the subset allocated for transmission of a first repetition of the one or more data repetitions, to a downlink symbol; and may determine to ignore the dynamic grant based at least in part on receiving the signaling comprising the uplink grant, wherein the dynamic grant is received before or after the uplink grant.

In some implementations, the UE may not receive a control message, before or after receiving the uplink grant, that informs the UE of a dynamic grant that reallocates a semi-static flexible symbol, within one or more symbols of the subset allocated for transmission of a first repetition of the one or more data repetitions, to a downlink symbol.

In some examples, the signaling further comprises an indication of a repetition length and a number of repetitions, and wherein the one or more data repetitions are transmitted over the subset of the plurality of symbols based at least in part on the repetition length and the number of repetitions. In some examples, a transmission duration of the time domain resource assignment indicates a contiguous set of symbols corresponding to the plurality of symbols. In some other examples, a transmission duration of the time domain resource assignment indicates a duration of the subset of the plurality of symbols, the subset of the plurality of symbols corresponding to symbols configured for uplink transmission within the plurality of symbols.

In some implemenations, a UE may determine a repetition length for the one or more data repetitions based at least in part on a duration between a starting symbol of the time domain resource assignment and a last symbol of a first slot of the plurality of slots. The UE may determine a number of repetitions for the one or more data repetitions based at least in part the repetition length and a transmission duration of the time domain resource assignment.

In some other examples, the one or more data repetitions are associated with a first traffic type, and the UE may receive a second grant comprising a second time domain resource assignment associated with a second traffic type and may identify a second subset of the plurality of symbols for scheduling a data communication over the second time domain resource assignment based at least in part on the dynamic slot format indication.

In some examples, the UE may receive a plurality of slot format patterns, wherein the uplink grant identifies one of the plurality of slot format patterns for the at least one of the plurality of slots. In some examples, the plurality of slot format patterns are received via radio resource control (RRC) signaling.

The UE may in some examples receive a second grant comprising a second time domain resource assignment associated with the second traffic type, and may identify, based at least in part on the second grant, a second subset of the plurality of symbols for scheduling a data communication of the second traffic type based at least in part on the directions for the plurality of symbols identified based at least in part on the second dynamic slot format indication.

In some implementations, the UE may determine a repetition format from a plurality of repetition formats for the one or more data repetitions, the plurality of repetition formats comprising a first repetition format having one or more repetitions of an indicated mini-slot duration in each of the plurality of slots and a second repetition format comprising a single repetition for each set of contiguous uplink symbols for each of the plurality of slots. In some examples, the determining the repetition format is based at least in part on an indicator in the uplink grant of the first repetition format or the second repetition format for the one or more data repetitions. In some other examples, the determining the repetition format is based at least in part on comparing a transmission duration of the time domain resource assignment for the one or more data repetitions with a threshold duration.

The operations of 1115 may be performed according to the methods described herein. The operations in each block of the flow chart may be performed individually or in any combination. In some examples, aspects of the operations of 1115 may be performed by a scheduling component as described with reference to FIGS. 7-10.

At 1120, the UE may transmit, to the base station, the one or more data repetitions over the subset of the plurality of symbols. The operations of 1120 may be performed according to the methods described herein. In some examples, aspects of the operations of 1120 may be performed by a data repetition component as described with reference to FIGS. 7-10. The operations in each block of the flowchart 1100 may be performed individually or in any combination.

Figure 12:
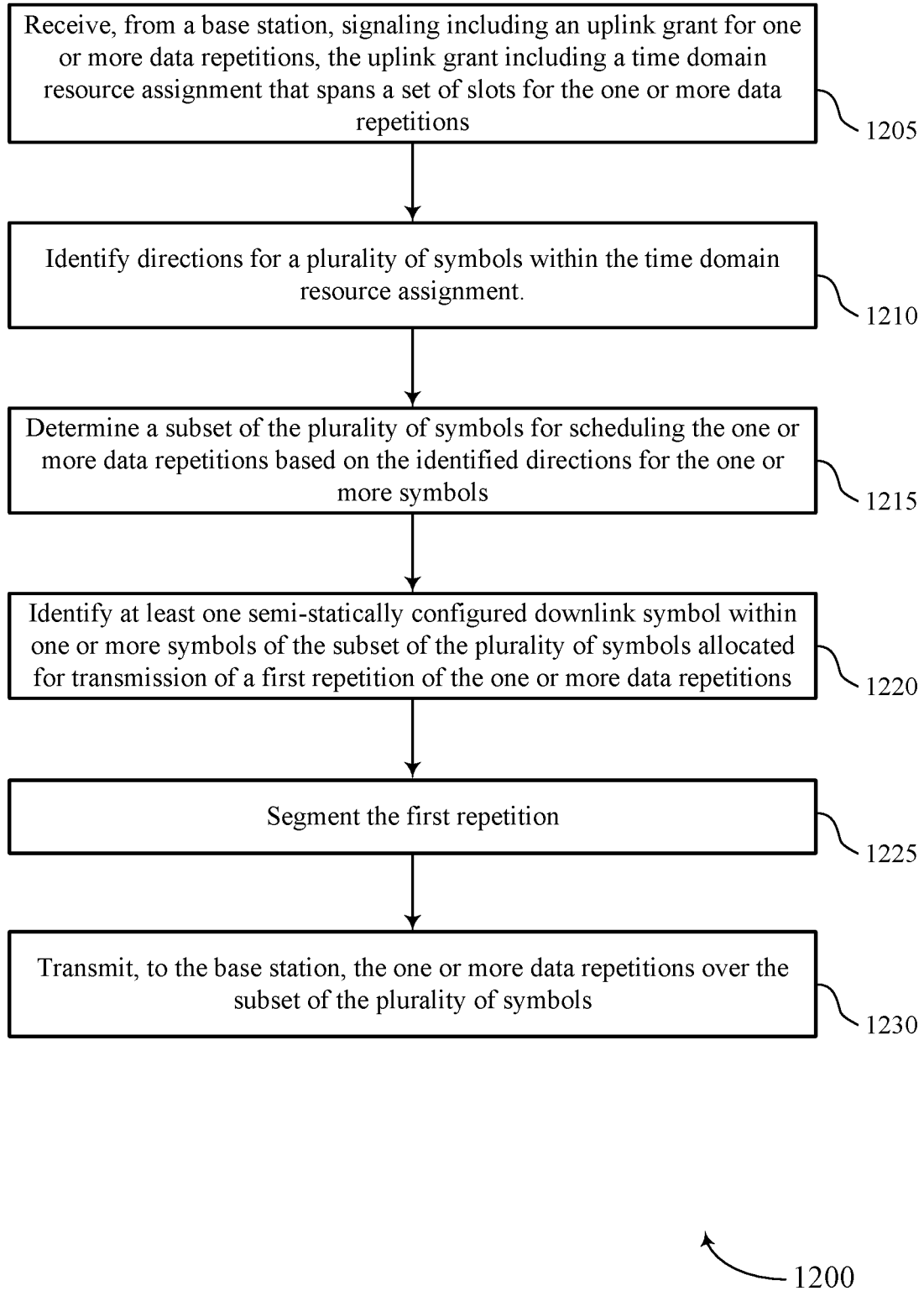

FIG. 12 shows a flowchart illustrating a method 1200 that supports physical uplink shared channel repetition across slot boundary in accordance with aspects of the present disclosure. The operations of method 1200 may be implemented by a UE 115 or its components as described herein. For example, the operations of method 1200 may be performed by a communications manager as described with reference to FIGS. 7-10. In some examples, a UE may execute a set of instructions to control the functional elements of the UE to perform the functions described below. Additionally or alternatively, a UE may perform aspects of the functions described below using special-purpose hardware.

At 1205, the UE may receive, from a base station, signaling including an uplink grant for one or more data repetitions, the uplink grant including a time domain resource assignment that spans a set of slots for the one or more data repetitions. The operations of 1205 may be performed according to the methods described herein. In some examples, aspects of the operations of 1205 may be performed by a signaling component as described with reference to FIGS. 7-10.

At 1210, the UE may identify directions for a plurality of symbols within the time domain resource assignment. The operations of 1210 may be performed according to the methods described herein. In some examples, aspects of the operations of 1210 may be performed by a data traffic component as described with reference to FIGS. 7-10.

At 1215, the UE may determine a subset of the plurality of symbols for scheduling the one or more data repetitions based on the identified directions for the plurality of symbols. The operations of 1215 may be performed according to the methods described herein. In some examples, aspects of the operations of 1215 may be performed by a scheduling component as described with reference to FIGS. 7-10.

At 1220, the UE may identify at least one semi-statically configured downlink symbol within one or more symbols of the subset of the plurality of symbols allocated for transmission of a first repetition of the one or more data repetitions. The operations of 1220 may be performed according to the methods described herein. In some examples, aspects of the operations of 1220 may be performed by a symbol identification component as described with reference to FIGS. 7-10.

At 1225, the UE may segment the first repetition. In some implementations, the UE may segment the first repetition based on the first repetition being transmitted over a slot boundary. In some other implementations, the UE may segment the first repetition based on the presence of a configured downlink symbol in the repetition. The operations of 1225 may be performed according to the methods described herein. In some examples, aspects of the operations of 1225 may be performed by a segmenting component as described with reference to FIGS. 7-10.

At 1230, the UE may transmit, to the base station, the one or more data repetitions over the subset of the plurality of symbols. In some implementations, the number of data repetitions may be based on segmenting the one or more data repetitions. The operations of 1230 may be performed according to the methods described herein. In some examples, aspects of the operations of 1230 may be performed by a data repetition component as described with reference to FIGS. 7-10.

Figure 13:
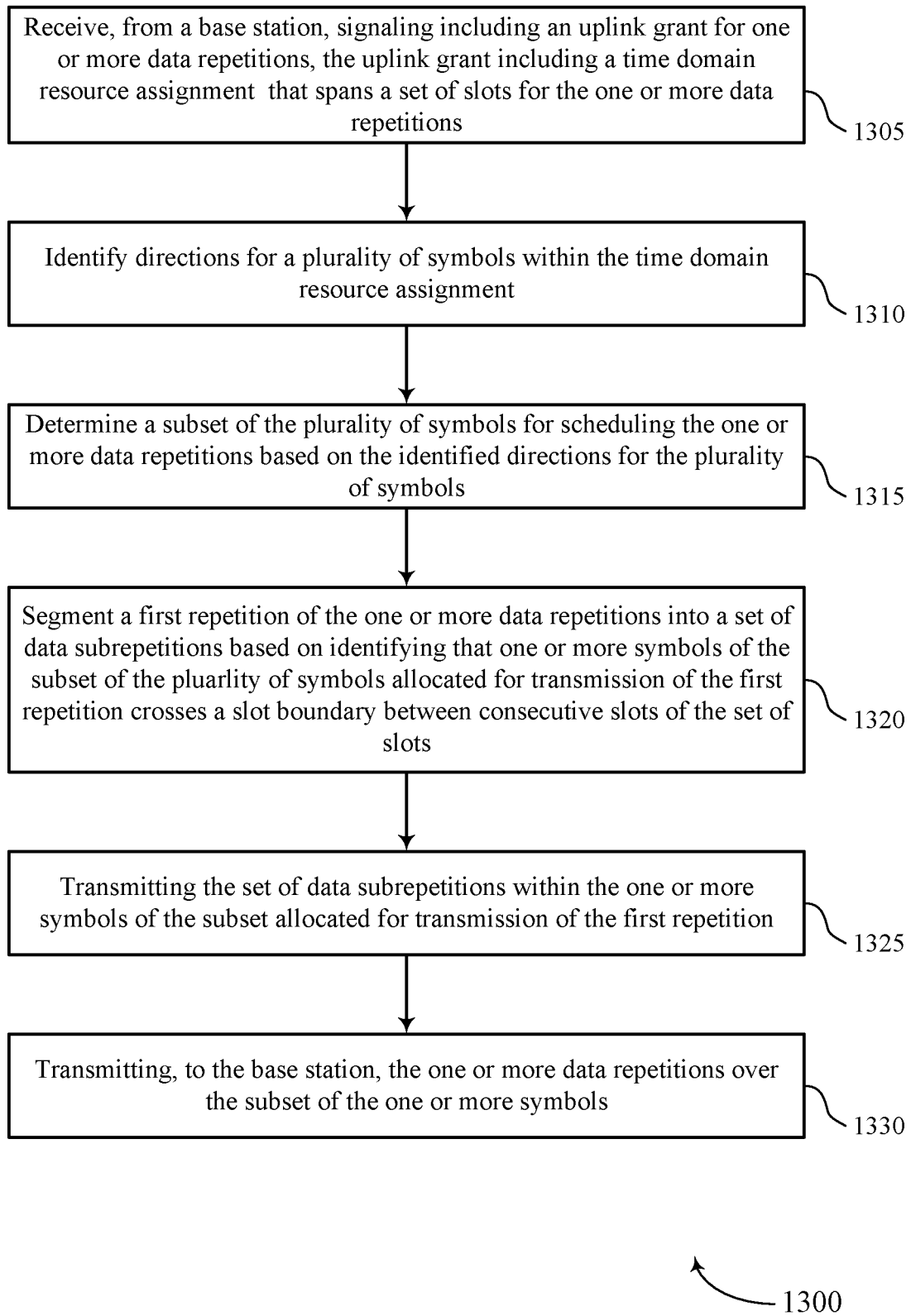

FIG. 13 shows a flowchart illustrating a method 1300 that supports physical uplink shared channel repetition across slot boundary in accordance with aspects of the present disclosure. The operations of method 1300 may be implemented by a UE 115 or its components as described herein. For example, the operations of method 1300 may be performed by a communications manager as described with reference to FIGS. 7-10. In some examples, a UE may execute a set of instructions to control the functional elements of the UE to perform the functions described below. Additionally or alternatively, a UE may perform aspects of the functions described below using special-purpose hardware.

At 1305, the UE may receive, from a base station, signaling including an uplink grant for one or more data repetitions, the uplink grant including a time domain resource assignment that spans a set of slots for the one or more data repetitions. The operations of 1305 may be performed according to the methods described herein. In some examples, aspects of the operations of 1305 may be performed by a signaling component as described with reference to FIGS. 7-10.

At 1310, the UE may identify directions for a plurality of symbols within the time domain resource assignment. The operations of 1310 may be performed according to the methods described herein. In some examples, aspects of the operations of 1310 may be performed by a data traffic component as described with reference to FIGS. 7-10.

At 1315, the UE may determine a subset of the plurality of symbols for scheduling the one or more data repetitions based on the identified directions for the plurality of symbols. The operations of 1315 may be performed according to the methods described herein. In some examples, aspects of the operations of 1315 may be performed by a scheduling component as described with reference to FIGS. 7-10.

At 1320, the UE may segment a first repetition of the one or more data repetitions into a set of data subrepetitions based on identifying that one or more symbols of the subset allocated for transmission of the first repetition crosses a slot boundary between consecutive slots of the set of slots, where transmitting the one or more data repetitions includes. The operations of 1320 may be performed according to the methods described herein. In some examples, aspects of the operations of 1320 may be performed by a segmenting component as described with reference to FIGS. 7-10.

At 1325, the UE may transmit the set of data subrepetitions within the one or more symbols of the subset allocated for transmission of the first repetition. The operations of 1325 may be performed according to the methods described herein. In some examples, aspects of the operations of 1325 may be performed by a signaling component as described with reference to FIGS. 7-10.

At 1330, the UE may transmit, to the base station, the one or more data repetitions over the subset of the plurality of symbols. The operations of 1330 may be performed according to the methods described herein. In some examples, aspects of the operations of 1330 may be performed by a data repetition component as described with reference to FIGS. 7-10.

Figure 14:
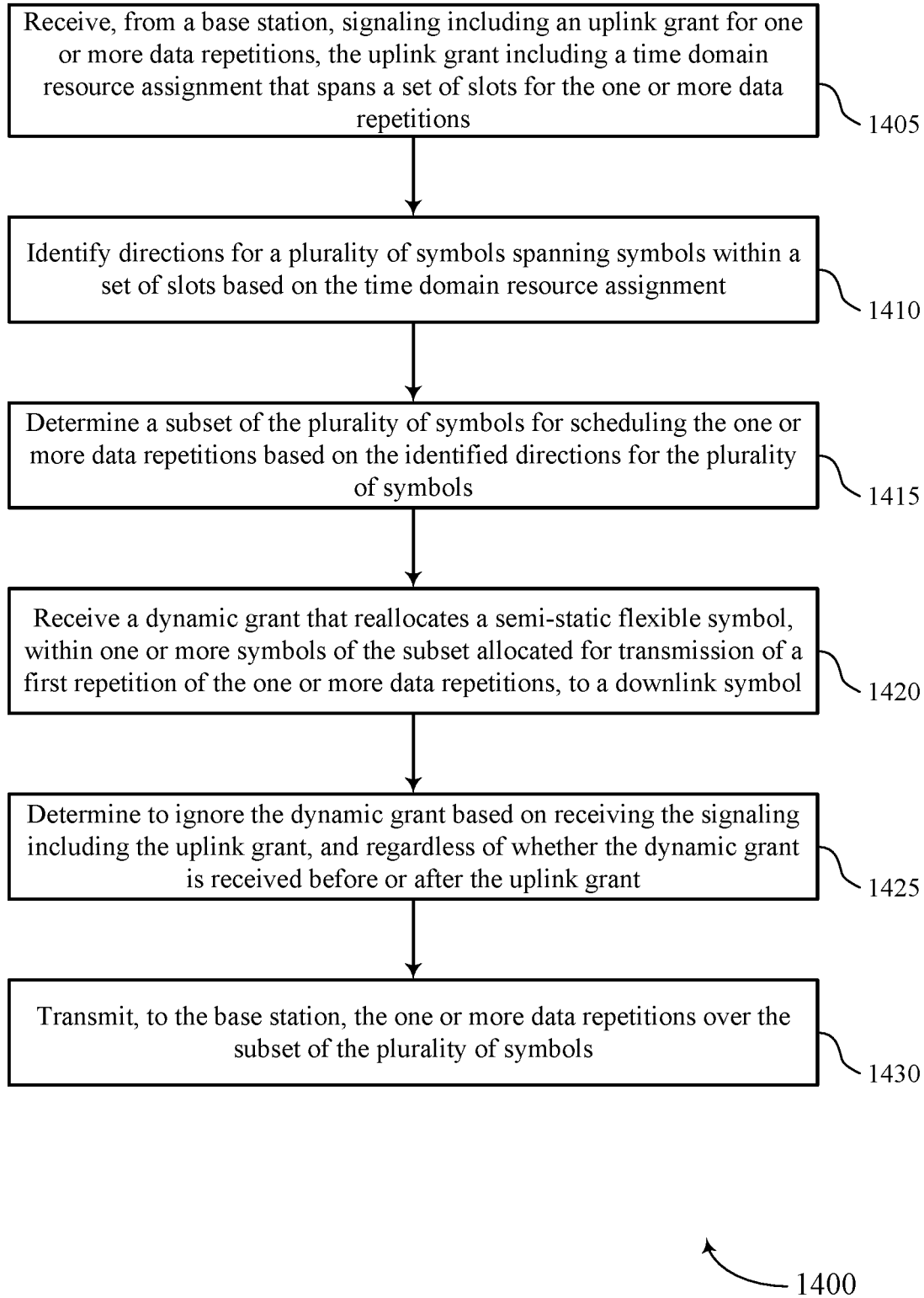

FIG. 14 shows a flowchart illustrating a method 1400 that supports physical uplink shared channel repetition across slot boundary in accordance with aspects of the present disclosure. The operations of method 1400 may be implemented by a UE 115 or its components as described herein. For example, the operations of method 1400 may be performed by a communications manager as described with reference to FIGS. 7-10. In some examples, a UE may execute a set of instructions to control the functional elements of the UE to perform the functions described below. Additionally or alternatively, a UE may perform aspects of the functions described below using special-purpose hardware.

At 1405, the UE may receive, from a base station, signaling including an uplink grant for one or more data repetitions, the uplink grant including a time domain resource assignment that spans a set of slots for the one or more data repetitions. The operations of 1405 may be performed according to the methods described herein. In some examples, aspects of the operations of 1405 may be performed by a signaling component as described with reference to FIGS. 7-10.

At 1410, the UE may identify directions for a plurality of symbols spanning symbols within the time domain resource assignment. The operations of 1410 may be performed according to the methods described herein. In some examples, aspects of the operations of 1410 may be performed by a data traffic component as described with reference to FIGS. 7-10.

At 1415, the UE may determine a subset of the plurality of symbols for scheduling the one or more data repetitions based on the identified directions for the plurality of symbols. The operations of 1415 may be performed according to the methods described herein. In some examples, aspects of the operations of 1415 may be performed by a scheduling component as described with reference to FIGS. 7-10.

At 1420, the UE may receive a dynamic grant that reallocates a semi-static flexible symbol, within one or more symbols of the subset allocated for transmission of a first repetition of the one or more data repetitions, to a downlink symbol. The operations of 1420 may be performed according to the methods described herein. In some examples, aspects of the operations of 1420 may be performed by a signaling component as described with reference to FIGS. 7-10.

At 1425, the UE may determine to ignore the dynamic grant based on receiving the signaling including the uplink grant, and regardless of whether the dynamic grant is received before or after the uplink grant. The operations of 1425 may be performed according to the methods described herein. In some examples, aspects of the operations of 1425 may be performed by a signaling component as described with reference to FIGS. 7-10.

At 1430, the UE may transmit, to the base station, the one or more data repetitions over the subset of the plurality of symbols. The operations of 1430 may be performed according to the methods described herein. In some examples, aspects of the operations of 1430 may be performed by a data repetition component as described with reference to FIGS. 7-10.

Figure 15:
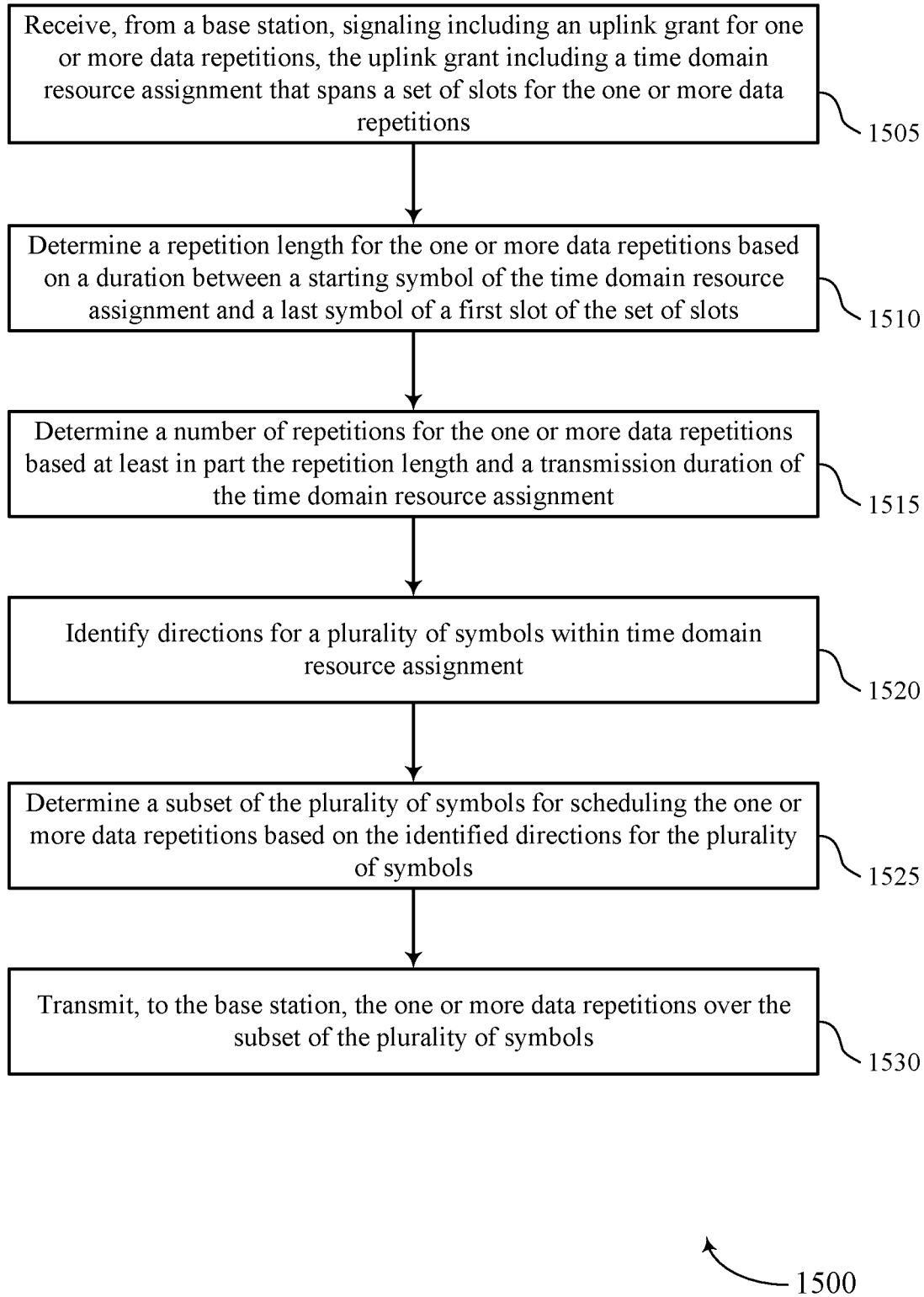

FIG. 15 shows a flowchart illustrating a method 1500 that supports physical uplink shared channel repetition across slot boundary in accordance with aspects of the present disclosure. The operations of method 1500 may be implemented by a UE 115 or its components as described herein. For example, the operations of method 1500 may be performed by a communications manager as described with reference to FIGS. 7-10. In some examples, a UE may execute a set of instructions to control the functional elements of the UE to perform the functions described below. Additionally or alternatively, a UE may perform aspects of the functions described below using special-purpose hardware.

At 1505, the UE may receive, from a base station, signaling including an uplink grant for one or more data repetitions, the uplink grant including a time domain resource assignment that spans a set of slots for the one or more data repetitions. The operations of 1505 may be performed according to the methods described herein. In some examples, aspects of the operations of 1505 may be performed by a signaling component as described with reference to FIGS. 7-10.

At 1510, the UE may determine a repetition length for the one or more data repetitions based on a duration between a starting symbol of the time domain resource assignment and a last symbol of a first slot of the set of slots. The operations of 1510 may be performed according to the methods described herein. In some examples, aspects of the operations of 1510 may be performed by a data repetition component as described with reference to FIGS. 7-10.

At 1515, the UE may determine a number of repetitions for the one or more data repetitions based at least in part the repetition length and a transmission duration of the time domain resource assignment. The operations of 1515 may be performed according to the methods described herein. In some examples, aspects of the operations of 1515 may be performed by a data repetition component as described with reference to FIGS. 7-10.

At 1520, the UE may identify directions for a plurality of symbols within the time domain resource assignment. The operations of 1520 may be performed according to the methods described herein. In some examples, aspects of the operations of 1520 may be performed by a data traffic component as described with reference to FIGS. 7-10.

At 1525, the UE may determine a subset of the plurality of symbols for scheduling the one or more data repetitions based on the identified directions for the plurality of symbols. The operations of 1525 may be performed according to the methods described herein. In some examples, aspects of the operations of 1525 may be performed by a scheduling component as described with reference to FIGS. 7-10.

At 1530, the UE may transmit, to the base station, the one or more data repetitions over the subset of the plurality of symbols. The operations of 1530 may be performed according to the methods described herein. In some examples, aspects of the operations of 1530 may be performed by a data repetition component as described with reference to FIGS. 7-10.

Figure 16:
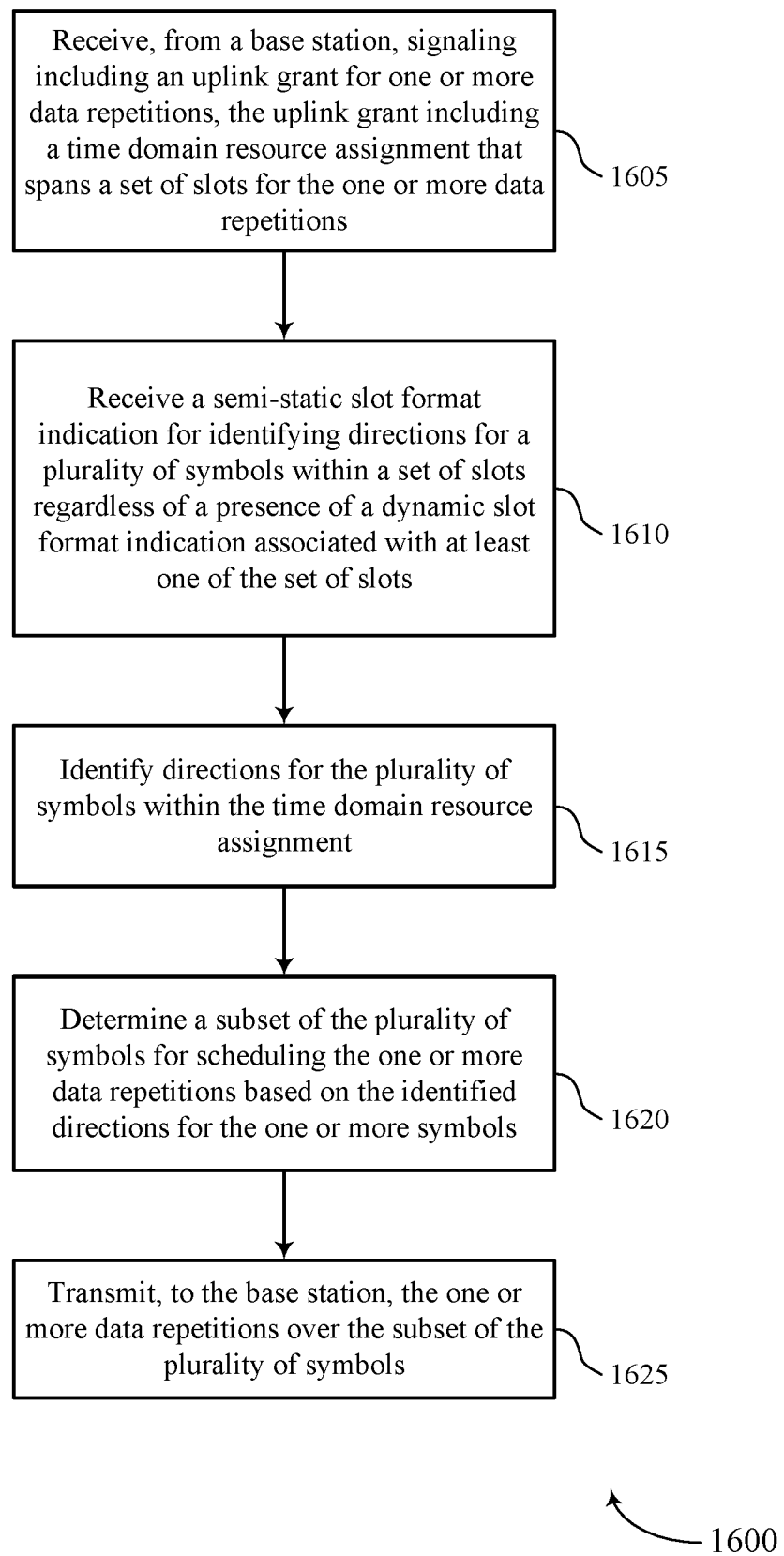

FIG. 16 shows a flowchart illustrating a method 1600 that supports physical uplink shared channel repetition across slot boundary in accordance with aspects of the present disclosure. The operations of method 1600 may be implemented by a UE 115 or its components as described herein. For example, the operations of method 1600 may be performed by a communications manager as described with reference to FIGS. 7-10. In some examples, a UE may execute a set of instructions to control the functional elements of the UE to perform the functions described below. Additionally or alternatively, a UE may perform aspects of the functions described below using special-purpose hardware.

At 1605, the UE may receive, from a base station, signaling including an uplink grant for one or more data repetitions, the uplink grant including a time domain resource assignment that spans a set of slots for the one or more data repetitions. The operations of 1605 may be performed according to the methods described herein. In some examples, aspects of the operations of 1605 may be performed by a signaling component as described with reference to FIGS. 7-10.

At 1610, the UE may receive a semi-static slot format indication for identifying directions for a plurality of symbols within a set of slots, regardless of a presence of a dynamic slot format indication associated with at least one of the plurality of slots. The operations of 1610 may be performed according to the methods described herein. In some examples, aspects of the operations of 1610 may be performed by a slot format component as described with reference to FIGS. 7-10.

At 1615, the UE may identify directions for the plurality of symbols within the time domain resource assignment. The operations of 1615 may be performed according to the methods described herein. In some examples, aspects of the operations of 1615 may be performed by a data traffic component as described with reference to FIGS. 7-10.

At 1620, the UE may determine a subset of the plurality of symbols for scheduling the one or more data repetitions based on the identified directions for the plurality of symbols. The operations of 1620 may be performed according to the methods described herein. In some examples, aspects of the operations of 1620 may be performed by a scheduling component as described with reference to FIGS. 7-10.

At 1625, the UE may transmit, to the base station, the one or more data repetitions over the subset of the plurality of symbols. The operations of 1625 may be performed according to the methods described herein. In some examples, aspects of the operations of 1625 may be performed by a data repetition component as described with reference to FIGS. 7-10.

Figure 17:
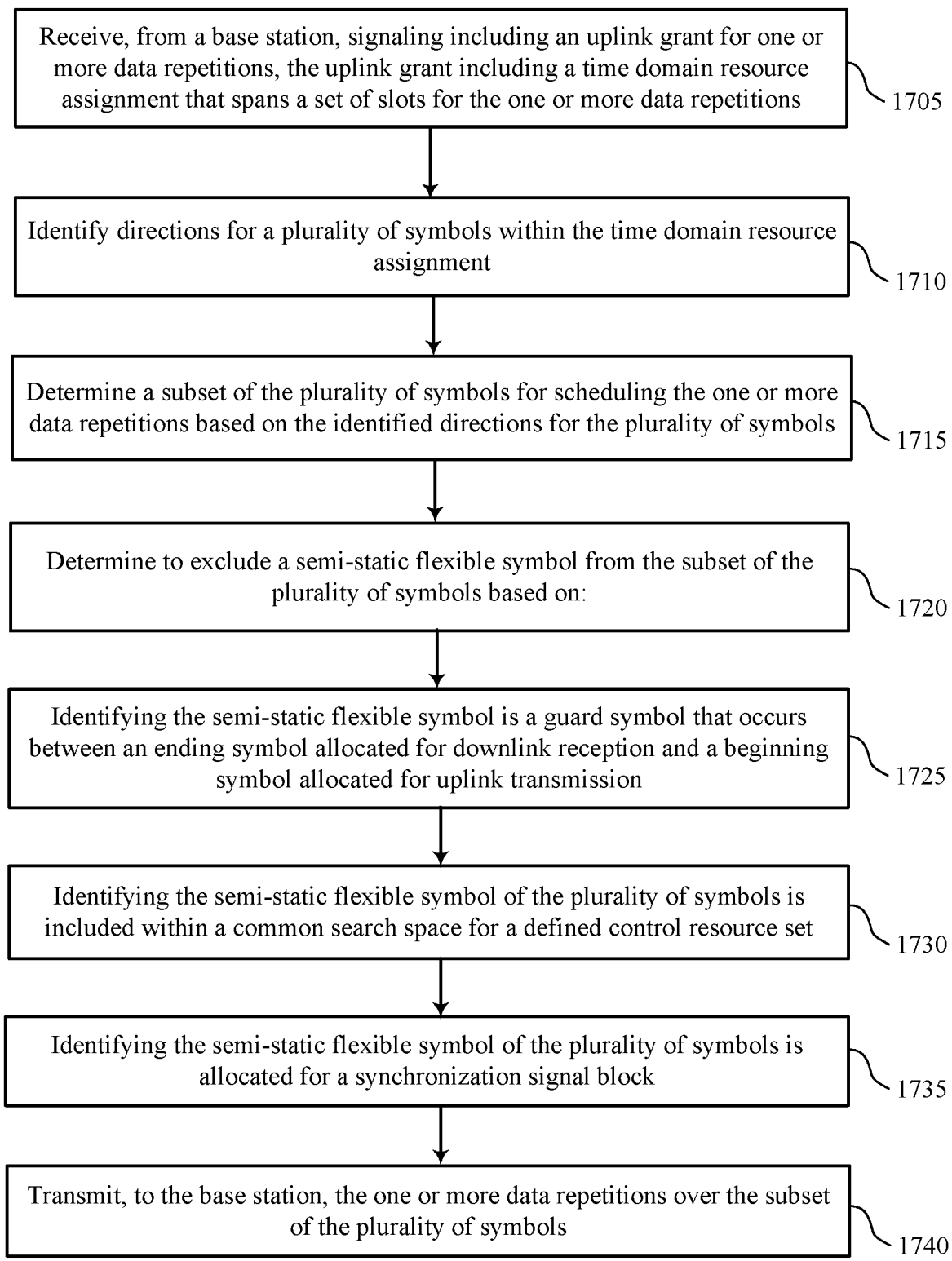

FIG. 17 shows a flowchart illustrating a method 1700 that supports physical uplink shared channel repetition across slot boundary in accordance with aspects of the present disclosure. The operations of method 1700 may be implemented by a UE 115 or its components as described herein. For example, the operations of method 1700 may be performed by a communications manager as described with reference to FIGS. 7-10. In some examples, a UE may execute a set of instructions to control the functional elements of the UE to perform the functions described below. Additionally or alternatively, a UE may perform aspects of the functions described below using special-purpose hardware.

At 1705, the UE may receive, from a base station, signaling including an uplink grant for one or more data repetitions, the uplink grant including a time domain resource assignment that spans a set of slots for the one or more data repetitions. The operations of 1705 may be performed according to the methods described herein. In some examples, aspects of the operations of 1705 may be performed by a signaling component as described with reference to FIGS. 7-10.

At 1710, the UE may identify directions for a plurality of symbols within the time domain resource assignment. The operations of 1710 may be performed according to the methods described herein. In some examples, aspects of the operations of 1710 may be performed by a data traffic component as described with reference to FIGS. 7-10.

At 1715, the UE may determine a subset of the plurality of symbols for scheduling the one or more data repetitions based on the identified directions for the plurality of symbols. The operations of 1715 may be performed according to the methods described herein. In some examples, aspects of the operations of 1715 may be performed by a scheduling component as described with reference to FIGS. 7-10.

At 1720, the UE may determine to exclude a semi-static flexible symbol from the subset of the plurality of symbols for scheduling the one or more data repetitions based on identifying at least one example described with reference to operations 1725-1735. It is noted that operations 1725-1735 may be performed separately or in any combination. The operations of 1720 may be performed according to the methods described herein. In some examples, aspects of the operations of 1720 may be performed by a scheduling component as described with reference to FIGS. 7-10.

At 1725, the UE may determine to exclude a semi-static flexible symbol from the subset of the plurality of symbols for scheduling the one or more data repetitions based on identifying that the semi-static flexible symbol of the plurality of symbols is a guard symbol that occurs between an ending symbol allocated for downlink reception within the plurality of symbols, and a beginning symbol allocated for uplink transmission within the plurality of symbols. The operations of 1725 may be performed according to the methods described herein. In some examples, aspects of the operations of 1725 may be performed by a scheduling component as described with reference to FIGS. 7-10.

At 1730, the UE may determine to exclude a semi-static flexible symbol from the subset of the plurality of symbols for scheduling the one or more data repetitions based on identifying that the semi-static flexible symbol of the plurality of symbols is included within a common search space for a defined control resource set. The operations of 1730 may be performed according to the methods described herein. In some examples, aspects of the operations of 1730 may be performed by a scheduling component as described with reference to FIGS. 7-10.

At 1735, the UE may determine to exclude a semi-static flexible symbol from the subset of the plurality of symbols for scheduling the one or more data repetitions based on identifying that the semi-static flexible symbol of the plurality of symbols is allocated for a synchronization signal block. The operations of 1735 may be performed according to the methods described herein. In some examples, aspects of the operations of 1735 may be performed by a scheduling component as described with reference to FIGS. 7-10.

At 1740, the UE may transmit, to the base station, the one or more data repetitions over the subset of the one or more symbols. The operations of 1740 may be performed according to the methods described herein. In some examples, aspects of the operations of 1740 may be performed by a data repetition component as described with reference to FIGS. 7-10.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (for example, several kilometers in radius) and may allow unrestricted access by UEs with service subscriptions with the network provider. A small cell may be associated with a lower-powered base station, as compared with a macro cell, and a small cell may operate in the same or different (for example, licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (for example, a home) and may provide restricted access by UEs having an association with the femto cell (for example, UEs in a closed subscriber group (CSG), UEs for users in the home, among other examples). An eNB for a macro cell may be referred to as a macro eNB. An eNB for a small cell may be referred to as a small cell eNB, a pico eNB, a femto eNB, or a home eNB. An eNB may support one or multiple (for example, two, three, four, among other examples) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at different locations, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (for example, A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
    receiving, from a base station, signaling comprising an uplink grant for one or more data repetitions, the signaling indicating a time domain resource assignment and a number of repetitions, a starting symbol for the one or more data repetitions being based on the time domain resource assignment;
    segmenting symbols, based on the time domain resource assignment, for the one or more data repetition, a number of the one or more data repetitions being different from the number of repetitions; and
    transmitting, to the base station, at least one of the one or more data repetitions over the segmented symbols.

2. An apparatus for wireless communications at a user equipment (UE), comprising:
    a processor,
    memory coupled with the processor; and instructions stored in the memory and executable by the processor to cause the apparatus to:

receive, from a base station, signaling comprising an uplink grant for one or more data repetitions, the signaling indicating a time domain resource assignment and a number of repetitions, a starting symbol for the one or more data repetitions being based on the time domain resource assignment;

segment symbols, based on the time domain resource assignment, for the one or more data repetition, a number of the one or more data repetitions being different from the number of repetitions; and transmit, to the base station, at least one of the one or more data repetitions over the segmented symbols.

3. The method of claim 1, the segmenting comprising segmenting over a slot boundary or a downlink symbol.

4. The method of claim 3, a segment being dropped from transmission for not having enough symbols.

5. The method of claim 4, a second segment being dropped from transmission for comprising a reference signal.

6. The method of claim 5, the segmented symbols being further based on excluding a certain symbol, the certain symbol being indicated as a semi-static downlink or a symbol of synchronization signal block.

7. The method of claim 5, the segmenting symbols comprising segmenting a transmission duration of contiguous symbols, the transmission duration of contiguous symbols being based on the time domain resource assignment.

8. The method of claim 7, the signaling comprising a downlink control information transmission, and the time domain resource assignment comprising a start and length indicator (SLIV), the starting symbol and the transmission duration of contiguous symbols being based on the SLIV.

9. The method of claim 7, the one or more data repetitions comprising one or more sets of contiguous uplink symbols, each of the one or more data repetitions corresponds to one of the one or more sets of the contiguous uplink symbols.

10. The method of claim 1, the segmenting symbols comprising segmenting a transmission duration of contiguous symbols, the transmission duration of contiguous symbols being based on the time domain resource assignment.

11. The method of claim 10, the signaling comprising a downlink control information transmission, and the time domain resource assignment comprising a start and length indicator (SLIV), the starting symbol and the transmission duration of contiguous symbols being based on the SLIV.

12. The method of claim 10, the one or more data repetitions comprising one or more sets of contiguous uplink symbols, each of the one or more data repetitions corresponds to one of the one or more sets of the contiguous uplink symbols.

13. The method of claim 12, the segmenting comprising segmenting over a slot boundary or a downlink symbol.

14. The method of claim 12, a segment being dropped from transmission for not having enough symbols or comprising a reference signal.

15. The apparatus of claim 2, instructions stored in the memory and executable by the processor to further cause the apparatus to:

segment over a slot boundary or a downlink symbol.

16. The apparatus of claim 15, instructions stored in the memory and executable by the processor to further cause the apparatus to:

drop a segment from transmission for not having enough symbols or comprising a references signal.

17. The apparatus of claim 16, the segmented symbols being further based on excluding a certain symbol, the certain symbol being indicated as a semi-static downlink or a symbol of synchronization signal block.

18. The apparatus of claim 16, instructions stored in the memory and executable by the processor to further cause the apparatus to:

segment a transmission duration of contiguous symbols, the transmission duration of contiguous symbols being based on the time domain resource assignment.

19. The apparatus of claim 18, the signaling comprising a downlink control information transmission, and the time domain resource assignment comprising a start and length indicator (SLIV), the starting symbol and the transmission duration of contiguous symbols being based on the SLIV.

20. The apparatus of claim 18, the one or more data repetitions comprising one or more sets of contiguous uplink symbols, each of the one or more data repetitions corresponds to one of the one or more sets of the contiguous uplink symbols.

21. The apparatus of claim 2, instructions stored in the memory and executable by the processor to further cause the apparatus to:

segment a transmission duration of contiguous symbols, the transmission duration of contiguous symbols being based on the time domain resource assignment.

22. The apparatus of claim 21, the signaling comprising a downlink control information transmission, and the time domain resource assignment comprising a start and length indicator (SLIV), the starting symbol and the transmission duration of contiguous symbols being based on the SLIV.

23. The apparatus of claim 21, the one or more data repetitions comprising one or more sets of contiguous uplink symbols, each of the one or more data repetitions corresponds to one of the one or more sets of the contiguous uplink symbols.

24. The apparatus of claim 23, instructions stored in the memory and executable by the processor to further cause the apparatus to:

segment over a slot boundary or a downlink symbol.

25. The apparatus of claim 24, instructions stored in the memory and executable by the processor to further cause the apparatus to:

drop a segment from transmission for not having enough symbols or comprising a references signal.

* * * * *